(12) United States Patent
Chen et al.

(10) Patent No.: US 11,392,668 B2
(45) Date of Patent: Jul. 19, 2022

(54) ATTITUDE MATRIX CALCULATION METHOD AND DEVICE

(71) Applicant: Huawei Technologies Co., Ltd., Shenzhen (CN)

(72) Inventors: Xiaohan Chen, Shenzhen (CN); Yu Wang, Beijing (CN); Chen Dong, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 209 days.

(21) Appl. No.: 16/649,004

(22) PCT Filed: Sep. 30, 2017

(86) PCT No.: PCT/CN2017/105065
§ 371 (c)(1),
(2) Date: Mar. 19, 2020

(87) PCT Pub. No.: WO2019/061513
PCT Pub. Date: Apr. 4, 2019

(65) Prior Publication Data
US 2020/0293603 A1 Sep. 17, 2020

(51) Int. Cl.
*G06F 17/16* (2006.01)
*G01C 22/00* (2006.01)
*G06F 1/16* (2006.01)

(52) U.S. Cl.
CPC .......... *G06F 17/16* (2013.01); *G01C 22/006* (2013.01); *G06F 1/163* (2013.01)

(58) Field of Classification Search
CPC ........ G06F 17/16; G06F 1/163; G01C 22/006
See application file for complete search history.

(56) References Cited

U.S. PATENT DOCUMENTS

| 4,038,527 A | 7/1977 | Brodie et al. |
| 2021/0275098 A1* | 9/2021 | Tian .................... A61B 5/7455 |

FOREIGN PATENT DOCUMENTS

| CN | 101886927 A | 11/2010 |
| CN | 103499348 A | 1/2014 |

(Continued)

OTHER PUBLICATIONS

Bahillo et al., "Low-Cost Bluetooth Foot-Mounted IMU for Pedestrian Tracking in Industrial Environments," 2015 IEEE International Conference on Industrial Technology (ICIT), Mar. 2015.*

(Continued)

*Primary Examiner* — Toan M Le
*Assistant Examiner* — Xiuqin Sun
(74) *Attorney, Agent, or Firm* — Conley Rose, P.C.

(57) ABSTRACT

A method includes calculating, based on a first coordinate transformation matrix and a measured value of a gyroscope that corresponds to the ith sampling moment, a second coordinate transformation matrix corresponding to the ith sampling moment, where the first coordinate transformation matrix is a constant matrix, the first coordinate transformation matrix is a coordinate transformation matrix between a sensor coordinate system and a foot coordinate system, the second coordinate transformation matrix is a coordinate transformation matrix between the foot coordinate system and a ground coordinate system, and i is an integer greater than 0, and calculating, based on the first coordinate transformation matrix and the second coordinate transformation matrix corresponding to the ith sampling moment, an attitude matrix corresponding to the ith sampling moment, where the attitude matrix is a coordinate transformation matrix between the sensor coordinate system and the ground coordinate system.

20 Claims, 31 Drawing Sheets

(56) References Cited

FOREIGN PATENT DOCUMENTS

| | | | |
|---|---|---|---|
| CN | 103968827 A | 8/2014 | |
| CN | 104197938 A | 12/2014 | |
| CN | 104406586 A | 3/2015 | |
| CN | 104613963 A | 5/2015 | |
| CN | 104748751 A | 7/2015 | |
| CN | 104757976 A | 7/2015 | |
| CN | 104864869 A | 8/2015 | |
| CN | 106767929 A | 5/2017 | |
| JP | 1968604 B2 | 7/2012 | |
| WO | 2016123813 A1 | 8/2016 | |

OTHER PUBLICATIONS

Hu et al., "IMU-Assisted Monocular Visual Odometry Including the Human Walking Model for Wearable Applications," 2013 IEEE International Conference on Robotics and Automation (ICRA), May 2013.*

Wang, Q., et al., "Rapid Transfer Alignment Method based on Inertial Reference Frame," Journal of Chinese Inertial Technology, Feb. 2012, 2 pages.

Changsheng, T., et al., "3D Position Tracking Algorithm based on IMU," Electronic Measurement Technology, Apr. 2015, pp. 70-73.

Hassen Fourati, "Heterogeneous Data Fusion Algorithm for Pedestrian Navigation via Foot-Mounted Inertial Measurement Unit and Complementary Filter," XP011566444, IEEE Transactions On Instrumentation and Measurement, vol. 64, No. 1, Jan. 2015, 9 pages.

Thomas Seel, et al., "Realtime assessment of foot orientation by accelerometers and gyroscopes," XP055713900, Current Directions in Biomedical Engineering, vol. 1: Issue 1, Sep. 12, 2015, 4 pages.

James Diebel, et al.,"Representing Attitude: Euler Angles, Unit Quaternions, and Rotation Vectors," XP055626235, Oct. 20, 2006, 35 pages.

Ya Tian et al., "An Adaptive-Gain Complementary Filter for Real-Time Human Motion Tracking With MARG Sensors in Free-Living Environments," XP011495945, IEEE Transactions on Neural Systems and Rehabilitation Engineering, vol. 21, No. 2, Mar. 2013, 11 pages.

* cited by examiner

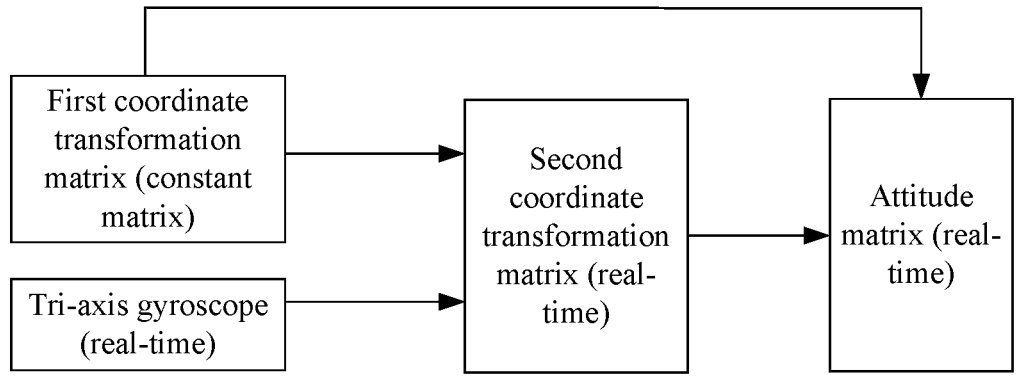

FIG. 6A

Calculate, based on a first coordinate transformation matrix and a measured value of a gyroscope that is corresponding to a sampling moment (for example, the $i^{th}$ sampling moment, where i is an integer greater than 0), a second coordinate transformation matrix corresponding to the sampling moment ⟋ 101

Calculate, based on the first coordinate transformation matrix and the second coordinate transformation matrix corresponding to the $i^{th}$ sampling moment, an attitude matrix corresponding to the $i^{th}$ sampling moment ⟋ 102

FIG. 6B

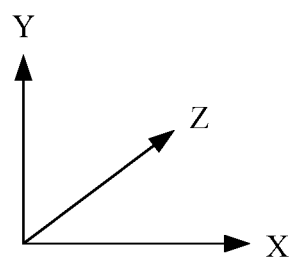
FIG. 9B

US 11,392,668 B2

ATTITUDE MATRIX CALCULATION METHOD AND DEVICE

CROSS-REFERENCE TO RELATED APPLICATIONS

This application is a National Stage of International Patent Application No. PCT/CN2017/105065 filed Sep. 30, 2017, which is hereby incorporated by reference in its entirety.

TECHNICAL FIELD

This application relates to the field of terminal technologies, and in particular, to an attitude matrix calculation method and a device.

BACKGROUND

As an important parameter for user motion (for example, walking or running) statistics, a motion distance can reflect magnitude of a quantity of motion of a user. Motion information, such as a pace, calories, and a step length, of the user may be calculated based on the motion distance. In combination with stride frequency and a motion time, the monition information may be used to perform overall evaluation on the quantity of motion, motion ability, and the like of the user. Motion guidance may be provided for the user based on the evaluation, to help the user create a personalized motion plan.

The prior art provides a solution for calculating a motion distance of a user. Referring to FIG. 1, in this solution, complex convergence is performed on real-time measured values of sensors such as a tri-axis gyroscope, a tri-axis accelerometer, and a tri-axis magnetometer in a portable device, to calculate a real-time attitude matrix of the sensors, that is, a real-time coordinate transformation matrix from a sensor coordinate system to a ground coordinate system; further, real-time acceleration of the sensors in the ground coordinate system is calculated based on the real-time attitude matrix, so that velocities and distances of the sensors in the ground coordinate system are calculated based on the real-time acceleration. The distances of the sensors in the ground coordinate system may be used to indicate a motion distance of a user.

In this solution, an algorithm for performing convergence on the real-time measured values of the sensors such as the tri-axis gyroscope, the tri-axis accelerometer, and the tri-axis magnetometer is relatively complex, for example, an unscented Kalman filter algorithm or an extended Kalman filter algorithm. In addition, complex matrix inversion or covariance matrix calculation, or the like is usually performed. Therefore, a calculation amount is large, and both power consumption and memory usage of the portable device are relatively large.

SUMMARY

Embodiments of this application provide an attitude matrix calculation method and a device, to reduce a calculation amount, reduce power consumption of a device, and save memory of the device.

To achieve the foregoing objectives, the following technical solutions are used in the embodiments of this application.

According to a first aspect, an embodiment of this application provides an attitude matrix calculation method, applied to a portable device, where the portable device includes a sensor, and the sensor includes a gyroscope. The method is related to a sensor coordinate system, a foot coordinate system, and a ground coordinate system, and the foot coordinate system is defined based on directions of a foot and a shank. The method includes: calculating, by the portable device based on a first coordinate transformation matrix and a measured value of the gyroscope that is corresponding to the $i^{th}$ sampling moment, a second coordinate transformation matrix corresponding to the $i^{th}$ sampling moment; and then calculating, by the portable device based on the first coordinate transformation matrix and the second coordinate transformation matrix corresponding to the $i^{th}$ sampling moment, an attitude matrix corresponding to the $i^{th}$ sampling moment. The first coordinate transformation matrix is a constant matrix, and the first coordinate transformation matrix is a coordinate transformation matrix between the sensor coordinate system and the foot coordinate system. The second coordinate transformation matrix is a coordinate transformation matrix between the foot coordinate system and the ground coordinate system, and i is an integer greater than 0. The attitude matrix is a coordinate transformation matrix between the sensor coordinate system and the ground coordinate system.

In this way, according to the method provided in this embodiment of this application, a real-time attitude matrix can be calculated based on a real-time measured value of the gyroscope, without a need of calculating the real-time attitude matrix with reference to real-time measured values of an accelerometer and a magnetometer. Therefore, complex convergence on the real-time measured value of the gyroscope and a real-time measured value of a sensor such as the accelerometer or the magnetometer is not required, and complex matrix inversion and covariance matrix calculation, and the like in a convergence process are not required. This can reduce a calculation amount in an attitude matrix calculation process, reduce power consumption of the portable device, and save memory of the portable device.

With reference to the first aspect, in a possible implementation, the attitude matrix is a coordinate transformation matrix from the sensor coordinate system to the ground coordinate system, the first coordinate transformation matrix is a coordinate transformation matrix from the sensor coordinate system to the foot coordinate system, and the second coordinate transformation matrix is a coordinate transformation matrix from the foot coordinate system to the ground coordinate system.

In this way, the portable device can calculate the coordinate transformation matrix from the sensor coordinate system to the ground coordinate system.

With reference to the first aspect and the foregoing possible implementation, in another possible implementation, the sensor further includes an accelerometer. After the calculating, based on the first coordinate transformation matrix and the second coordinate transformation matrix corresponding to the $i^{th}$ sampling moment, an attitude matrix corresponding to the $i^{th}$ sampling moment, the method further includes: calculating, by the portable device based on a measured value of the accelerometer that is corresponding to the $i^{th}$ sampling moment and the attitude matrix corresponding to the $i^{th}$ sampling moment, acceleration that is corresponding to the $i^{th}$ sampling moment and that is of the sensor in the ground coordinate system; calculating, by the portable device based on the acceleration that is corresponding to the $i^{th}$ sampling moment and that is of the sensor in the ground coordinate system, a velocity that is corresponding to the $i^{th}$ sampling moment and that is of the sensor in the ground coordinate system; and then calculating, by the portable device, a distance of the sensor in the ground coordinate system based on velocities that are corresponding to q sampling moments and that are of the sensor in the ground coordinate system, where q is an integer greater than or equal to 2.

In this way, the portable device can calculate the acceleration, the velocity, and the distance of the sensor in the ground coordinate system based on the attitude matrix.

With reference to the first aspect and the foregoing possible implementations, in another possible implementation, the method further includes: correcting, by the portable device, a velocity that is corresponding to each sampling moment in a time period from the $j^{th}$ correction moment to the $(j-1)^{th}$ correction moment and that is of the sensor on an $n^{th}$ coordinate axis of the ground coordinate system, so that at the $j^{th}$ correction moment, a corrected velocity of the sensor on the $n^{th}$ coordinate axis of the ground coordinate system is 0, where j is an integer greater than 0, and a value of n is 1, 2, or 3. The correction moment is a moment that is corresponding to a minimum value of a velocity of the sensor on a second coordinate axis of the ground coordinate system and that is in preset duration including a foot landing moment, and the foot landing moment is a moment corresponding to a maximum value of magnitude of a vector represented by a measured value of the accelerometer.

In this way, after the $j^{th}$ correction moment, the portable device can correct a velocity that is corresponding to each sampling moment in the time period from the $j^{th}$ correction moment to the $(j-1)^{th}$ correction moment and that is of the sensor on any coordinate axis of the ground coordinate system.

With reference to the first aspect and the foregoing possible implementations, in another possible implementation, after the $j^{th}$ correction moment, the calculating, by the portable device, a distance of the sensor in the ground coordinate system based on velocities that are corresponding to q sampling moments and that are of the sensor in the ground coordinate system includes: calculating, by the portable device based on a corrected velocity that is corresponding to each sampling moment in the time period from the $j^{th}$ correction moment to the $(j-1)^{th}$ correction moment and that is of the sensor on the $n^{th}$ coordinate axis of the ground coordinate system, a distance of the sensor on the $n^{th}$ coordinate axis of the ground coordinate system in the time period from the $j^{th}$ correction moment to the $(j-1)^{th}$ correction moment; and calculating, by the portable device, a total distance that is corresponding to the $j^{th}$ correction moment and that is of the sensor in the ground coordinate system, based on the distance of the sensor on the $n^{th}$ coordinate axis of the ground coordinate system in the time period from the $j^{th}$ correction moment to the $(j-1)^{th}$ correction moment, and a total distance that is corresponding to the $(j-1)^{th}$ correction moment and that is of the sensor in the ground coordinate system.

In this way, the portable device can calculate the distance based on the corrected velocity.

With reference to the first aspect and the foregoing possible implementations, in another possible implementation, the correcting, by the portable device, a velocity that is corresponding to each sampling moment in a time period from the $j^{th}$ correction moment to the $(j-1)^{th}$ correction moment and that is of the sensor on an $n^{th}$ coordinate axis of the ground coordinate system includes: separately correcting, by the portable device based on an expression 4, the velocity that is corresponding to each sampling moment in the time period from the $j^{th}$ correction moment to the $(j-1)^{th}$ correction moment and that is of the sensor on the $n^{th}$ coordinate axis of the ground coordinate system. The expression 4 is as follows:

$$\bar{v}_g^k(t_i) = v_g^k(t_i) - (t_i - t^{j-1}) \frac{v_g^k(t^j) - v_g^k(t^{j-1})}{t^j - t^{j-1}} - v_g^k(t^{j-1}), t \in [t^{j-1}, t^j],$$

where $t^j$ indicates the $j^{th}$ correction moment, $t^{j-1}$ indicates the $(j-1)^{th}$ correction moment, $v_g^k(t_i)$ indicates a velocity that is corresponding to the $i^{th}$ sampling moment and that is of the sensor on the $n^{th}$ coordinate axis of the ground coordinate system, $\bar{v}_g^k(t_i)$ indicates a corrected velocity that is corresponding to the $i^{th}$ sampling moment and that is of the sensor on the $n^{th}$ coordinate axis of the ground coordinate system, $v_g^k(t_i)$ indicates a velocity that is corresponding to the $j^{th}$ correction moment and that is of the sensor on the $n^{th}$ coordinate axis of the ground coordinate system, and $v_g^k(t^{j-1})$ indicates a velocity that is corresponding to the $(j-1)^{th}$ correction moment and that is of the sensor on the $n^{th}$ coordinate axis of the ground coordinate system.

In this way, the portable device can correct a velocity of the sensor on any coordinate axis of the ground coordinate system in the time period from the $j^{th}$ correction moment to the $(j-1)^{th}$ correction moment based on velocities that are respectively corresponding to the $j^{th}$ correction moment and the $(j-1)^{th}$ correction moment and that are of the sensor on the any coordinate axis of the ground coordinate system.

With reference to the first aspect and the foregoing possible implementations, in another possible implementation, after the $j^{th}$ correction moment, the method further includes: constructing, by the portable device, a rotation matrix; and multiplying, by the portable device, the rotation matrix by an attitude matrix corresponding to the $m^{th}$ sampling moment after the $j^{th}$ correction moment, to obtain a corrected attitude matrix corresponding to the $m^{th}$ sampling moment, where m is an integer greater than 0. The correction moment is a moment that is corresponding to the minimum value of the velocity of the sensor on the second coordinate axis of the ground coordinate system and that is in the preset duration including the foot landing moment. The foot landing moment is a moment corresponding to the maximum value of the magnitude of the vector represented by the measured value of the accelerometer. The rotation matrix is shown in the following expression 5:

$$C = \begin{bmatrix} 1 & 0 & 0 \\ 0 & \cos\theta & \sin\theta \\ 0 & -\sin\theta & \cos\theta \end{bmatrix},$$

where C indicates the rotation matrix, and θ indicates a rotation angle.

In this way, the portable device can correct an attitude matrix after each correction moment, and calculate an attitude matrix corresponding to a subsequent sampling moment based on a corrected attitude matrix.

With reference to the first aspect and the foregoing possible implementations, in another possible implementation, the constructing, by the portable device, a rotation matrix includes: calculating, by the portable device, a rotation angle in the rotation matrix based on at least one of distances of the sensor on the second coordinate axis and a third coordinate axis of the ground coordinate system in the time period from the $j^{th}$ correction moment to the $(j-1)^{th}$ correction moment, or a velocity of the sensor on the second coordinate axis of the ground coordinate system at the $j^{th}$ correction moment; and constructing, by the portable device, the rotation matrix based on the rotation angle and the expression 5. The rotation angle θ is a first rotation angle $θ_1$ in an expression 6, a second rotation angle $θ_2$ in an expression 7, or a third rotation angle $θ_3$ in an expression 8. The expression 6 is as follows:

$$θ_1 = \arctan\left(\frac{l_g^3}{l_g^2}\right);$$

the expression 7 is as follows:

$$θ_2 = \arctan\left(\frac{v_{g\_min}^2}{T_1 \cdot a_z}\right);$$

and
the expression 8 is as follows:

$$θ_3 = kθ_1 + (1-k)θ_2, 0 \le k \le 1.$$

where arctan indicates arc tangent, $l_g^3$ indicates the distance of the sensor on the third coordinate axis of the ground coordinate system in the time period from the $j^{th}$ correction moment to the $(j-1)^{th}$ correction moment, $l_g^2$ indicates the distance of the sensor on the second coordinate axis of the ground coordinate system in the time period from the $j^{th}$ correction moment to the $(j-1)^{th}$ correction moment, $v_{g\_min}^2$ indicates the velocity that is corresponding to the $j^{th}$ correction moment and that is of the sensor on the second coordinate axis of the ground coordinate system, $a_z$ indicates gravity acceleration, and $T_1$ indicates the time period from the $j^{th}$ correction moment to the $(j-1)^{th}$ correction moment.

In this way, when the rotation matrix is $θ_1$, a distance of the sensor on the third coordinate axis (that is, a coordinate axis parallel to a gravity direction) of the ground coordinate system in a time period from the $j^{th}$ correction moment to the $(j+1)^{th}$ correction moment can be reduced. When the rotation matrix C is $θ_2$, a velocity of the sensor on the second coordinate axis of the ground coordinate system at the $(j+1)^{th}$ correction moment can be reduced. When the rotation matrix C is $θ_3$, the distance of the sensor on the third coordinate axis of the ground coordinate system in the time period from the $j^{th}$ correction moment to the $(j+1)^{th}$ correction moment, and the velocity of the sensor on the second coordinate axis of the ground coordinate system at the $(j+1)^{th}$ correction moment can be reduced.

With reference to the first aspect and the foregoing possible implementations, in another possible implementation, the calculating, by the portable device based on a measured value of the accelerometer that is corresponding to the $i^{th}$ sampling moment and the attitude matrix corresponding to the $i^{th}$ sampling moment, acceleration that is corresponding to the $i^{th}$ sampling moment and that is of the sensor in the ground coordinate system includes: calculating, by the portable device based on the measured value of the accelerometer that is corresponding to the $i^{th}$ sampling moment, the attitude matrix corresponding to the $i^{th}$ sampling moment, and an expression 1, the acceleration that is corresponding to the $i^{th}$ sampling moment and that is of the sensor in the ground coordinate system. The expression 1 is as follows:

$$\begin{bmatrix} a_{g,i}^1 \\ a_{g,i}^2 \\ a_{g,i}^3 \end{bmatrix} = R_{s,i}^g \begin{bmatrix} a_{s,i}^1 \\ a_{s,i}^2 \\ a_{s,i}^3 \end{bmatrix} - \begin{bmatrix} 0 \\ 0 \\ a_z \end{bmatrix},$$

where $$\begin{bmatrix} a_{g,i}^1 \\ a_{g,i}^2 \\ a_{g,i}^3 \end{bmatrix}$$

indicates the acceleration that is corresponding to the $i^{th}$ sampling moment and that is of the sensor in the ground coordinate system, $R_{s,i}^g$ indicates the attitude matrix corresponding to the $i^{th}$ sampling moment, $$\begin{bmatrix} a_{s,i}^1 \\ a_{s,i}^2 \\ a_{s,i}^3 \end{bmatrix}$$

indicates the measured value of the accelerometer that is corresponding to the $i^{th}$ sampling moment, and $a_z$ indicates the gravity acceleration.

In this way, the portable device can calculate acceleration that is corresponding to each sampling moment and that is of the sensor in the ground coordinate system.

With reference to the first aspect and the foregoing possible implementations, in another possible implementation, a first coordinate axis of the foot coordinate system, a second coordinate axis of the foot coordinate system, and a third coordinate axis of the foot coordinate system are perpendicular to each other, the second coordinate axis of the foot coordinate system is on a plane to which a direction of a heel-to-tiptoe connection line and an extension direction of the shank belong, and the third coordinate axis of the foot coordinate system is parallel to the extension direction of the shank.

In this way, the three coordinate axes of the foot coordinate system are perpendicular to each other, and when a user moves, the second coordinate axis of the foot coordinate system and the third coordinate axis of the foot coordinate system rotate around the first coordinate axis of the foot coordinate system along with the foot and shank.

With reference to the first aspect and the foregoing possible implementations, in another possible implementation, before the calculating, by the portable device based on a first coordinate transformation matrix and a measured value of the gyroscope that is corresponding to the $i^{th}$ sampling moment, a second coordinate transformation matrix corresponding to the $i^{th}$ sampling moment, the method further includes: calculating, by the portable device, the first coordinate transformation matrix based on the measured value of the accelerometer and the measured value of the gyroscope.

In this way, the portable device can calculate the second coordinate transformation matrix based on the constant matrix, namely, the first coordinate transformation matrix, obtained through calculation.

With reference to the first aspect and the foregoing possible implementations, in another possible implementation, the calculating, by the portable device, the first coordinate transformation matrix based on the measured value of the accelerometer and the measured value of the gyroscope includes: when a fluctuation range of the measured value of the accelerometer is greater than or equal to a first preset value, calculating, by the portable device, a first vector based on the measured value of the gyroscope and according to a principal component analysis method, where the first vector is a vector representation of the first coordinate axis of the foot coordinate system in the sensor coordinate system; when a fluctuation range of a measured value of the accelerometer in a consecutive time period Q is less than the first preset value, calculating, by the portable device, a second vector based on the measured value of the accelerometer in the consecutive time period Q, where the second vector is a vector representation of the third coordinate axis of the foot coordinate system in the sensor coordinate system, and the second vector is a unit vector; calculating, by the portable device, a third vector based on the first vector and the second vector, where the third vector is a vector representation of the second coordinate axis of the foot coordinate system in the sensor coordinate system, and the third vector is perpendicular to the first vector and the second vector; and constructing the first coordinate transformation matrix by using the first vector, the second vector, and the third vector.

In this way, the vector representations of the three coordinate axes of the foot coordinate system in the sensor coordinate system can be separately obtained, that is, the first coordinate transformation matrix is obtained.

With reference to the first aspect and the foregoing possible implementations, in another possible implementation, the calculating, by the portable device, a second vector based on the measured value of the accelerometer in the consecutive time period Q includes: calculating, by the portable device, the second vector based on an average value of the measured value of the accelerometer in the consecutive time period Q.

The second vector obtained based on the average value is more accurate.

With reference to the first aspect and the foregoing possible implementations, in another possible implementation, a first coordinate axis of the ground coordinate system, the second coordinate axis of the ground coordinate system, and the third coordinate axis of the ground coordinate system are perpendicular to each other, the second coordinate axis of the ground coordinate system is parallel to a heading direction of the user, and the third coordinate axis of the ground coordinate system is parallel to the gravity direction.

With reference to the first aspect and the foregoing possible implementations, in another possible implementation, the first coordinate axis of the ground coordinate system and the first coordinate axis of the foot coordinate system are in a same direction, a direction of the second coordinate axis of the ground coordinate system is the heading direction of the user, and a direction of the second coordinate axis of the foot coordinate system is a heel-to-tiptoe direction.

When the first coordinate axis of the ground coordinate system and the first coordinate axis of the foot coordinate system are in the same direction, the direction of the second coordinate axis of the ground coordinate system is the heading direction of the user, and the direction of the second coordinate axis of the foot coordinate system is the heel-to-tiptoe direction, calculation can be facilitated.

With reference to the first aspect and the foregoing possible implementations, in another possible implementation, the calculating, by the portable device based on a first coordinate transformation matrix and a measured value of the gyroscope that is corresponding to the $i^{th}$ sampling moment, a second coordinate transformation matrix corresponding to the $i^{th}$ sampling moment includes: multiplying, by the portable device, the first coordinate transformation matrix by the measured value of the gyroscope that is corresponding to the $i^{th}$ sampling moment, to obtain an angular velocity that is corresponding to the $i^{th}$ sampling moment and that is of the sensor in the foot coordinate system; and calculating, by the portable device based on the angular velocity that is corresponding to the $i^{th}$ sampling moment and that is of the sensor in the foot coordinate system, the second coordinate transformation matrix corresponding to the $i^{th}$ sampling moment.

In this way, the portable device can calculate, based on an angular velocity that is corresponding to each sampling moment and that is of the sensor in the foot coordinate system, a second coordinate transformation matrix corresponding to each sampling moment.

With reference to the first aspect and the foregoing possible implementations, in another possible implementation, the calculating, by the portable device based on the angular velocity that is corresponding to the $i^{th}$ sampling moment and that is of the sensor in the foot coordinate system, the second coordinate transformation matrix corresponding to the $i^{th}$ sampling moment includes: calculating, by the portable device based on the angular velocity that is corresponding to the $i^{th}$ sampling moment and that is of the sensor in the foot coordinate system, a sampling interval of the sensor, and an expression 2 or an expression 3, the second coordinate transformation matrix corresponding to the $i^{th}$ sampling moment. The expression 2 is as follows:

$$R_{f,i}^g = R_{f,i-1}^g \exp\left(\begin{bmatrix} 0 & -w_{f,i}^3 & w_{f,i}^2 \\ w_{f,i}^3 & 0 & -w_{f,i}^1 \\ -w_{f,i}^2 & w_{f,i}^1 & 0 \end{bmatrix} \cdot T_0\right);$$

and
the expression 3 is as follows:

$$R_{f,i}^g = R_{f,i-1}^g \begin{bmatrix} 1 & 0 & 0 \\ 0 & \cos(T_0 \cdot w_{f,i}^1) & -\sin(T_0 \cdot w_{f,i}^1) \\ 0 & \sin(T_0 \cdot w_{f,i}^1) & \cos(T_0 \cdot w_{f,i}^1) \end{bmatrix},$$

where $R_{f,i}^g$ indicates the second coordinate transformation matrix corresponding to the $i^{th}$ sampling moment, $R_{f,i-1}^g$ indicates a second coordinate transformation matrix corresponding to the $(i-1)^{th}$ sampling moment, exp( ) indicates an exponential function using a natural constant e as a base, $T_0$ indicates the sampling interval of the sensor, $w_{f,i}^1$ indicates an angular velocity at which the sensor rotates around the second coordinate axis of the foot coordinate system at the $i^{th}$ sampling moment, $w_{f,i}^2$ indicates an angular velocity at which the sensor rotates around the third coordinate axis of the foot coordinate system at the $i^{th}$ sampling moment, and $w_{f,i}^3$ indicates an angular velocity at which the sensor rotates around the first coordinate axis of the foot coordinate system at the $i^{th}$ sampling moment.

In this way, the portable device can calculate a second coordinate transformation matrix corresponding to a current sampling moment, based on an angular velocity that is corresponding to the current sampling moment and that is of the sensor in the foot coordinate system, and a second coordinate transformation matrix corresponding to a previous sampling moment of the current sampling moment.

According to a second aspect, an embodiment of this application provides a portable device. The portable device includes a sensor and a processor. The sensor includes a gyroscope. The processor is configured to: calculate, based on a first coordinate transformation matrix and a measured value of the gyroscope that is corresponding to the $i^{th}$ sampling moment, a second coordinate transformation matrix corresponding to the $i^{th}$ sampling moment; and then calculate, based on the first coordinate transformation matrix and the second coordinate transformation matrix corresponding to the $i^{th}$ sampling moment, an attitude matrix corresponding to the $i^{th}$ sampling moment. The first coordinate transformation matrix is a constant matrix, and the first coordinate transformation matrix is a coordinate transformation matrix between a sensor coordinate system and a foot coordinate system. The second coordinate transformation matrix is a coordinate transformation matrix between the foot coordinate system and a ground coordinate system, and i is an integer greater than 0. The attitude matrix is a coordinate transformation matrix between the sensor coordinate system and the ground coordinate system.

With reference to the second aspect, in a possible implementation, the attitude matrix is a coordinate transformation matrix from the sensor coordinate system to the ground coordinate system, the first coordinate transformation matrix is a coordinate transformation matrix from the sensor coordinate system to the foot coordinate system, and the second coordinate transformation matrix is a coordinate transformation matrix from the foot coordinate system to the ground coordinate system.

With reference to the second aspect and the foregoing possible implementation, in another possible implementation, the sensor further includes an accelerometer, and the processor is further configured to: calculate, based on a measured value of the accelerometer that is corresponding to the $i^{th}$ sampling moment and the attitude matrix corresponding to the $i^{th}$ sampling moment, acceleration that is corresponding to the $i^{th}$ sampling moment and that is of the sensor in the ground coordinate system; calculate, based on the acceleration that is corresponding to the $i^{th}$ sampling moment and that is of the sensor in the ground coordinate system, a velocity that is corresponding to the $i^{th}$ sampling moment and that is of the sensor in the ground coordinate system; and calculate a distance of the sensor in the ground coordinate system based on velocities that are corresponding to q sampling moments and that are of the sensor in the ground coordinate system, where q is an integer greater than or equal to 2.

With reference to the second aspect and the foregoing possible implementations, in another possible implementation, the processor is further configured to: before calculating, based on the first coordinate transformation matrix and the measured value of the gyroscope that is corresponding to the $i^{th}$ sampling moment, the second coordinate transformation matrix corresponding to the $i^{th}$ sampling moment, calculate the first coordinate transformation matrix based on the measured value of the accelerometer and the measured value of the gyroscope.

With reference to the second aspect and the foregoing possible implementations, in another possible implementation, a first coordinate axis of the foot coordinate system, a second coordinate axis of the foot coordinate system, and a third coordinate axis of the foot coordinate system are perpendicular to each other, the second coordinate axis of the foot coordinate system is on a plane to which a direction of a heel-to-tiptoe connection line and an extension direction of a shank belong, and the third coordinate axis of the foot coordinate system is parallel to the extension direction of the shank.

With reference to the second aspect and the foregoing possible implementations, in another possible implementation, a first coordinate axis of the ground coordinate system, a second coordinate axis of the ground coordinate system, and a third coordinate axis of the ground coordinate system are perpendicular to each other, the second coordinate axis of the ground coordinate system is parallel to a heading direction of a user, and the third coordinate axis of the ground coordinate system is parallel to a gravity direction.

With reference to the second aspect and the foregoing possible implementations, in another possible implementation, the processor is specifically configured to: multiply the first coordinate transformation matrix by the measured value of the gyroscope that is corresponding to the $i^{th}$ sampling moment, to obtain an angular velocity that is corresponding to the $i^{th}$ sampling moment and that is of the sensor in the foot coordinate system; and calculate, based on the angular velocity that is corresponding to the $i^{th}$ sampling moment and that is of the sensor in the foot coordinate system, the second coordinate transformation matrix corresponding to the $i^{th}$ sampling moment.

With reference to the second aspect and the foregoing possible implementations, in another possible implementation, the processor is further configured to: correct a velocity that is corresponding to each sampling moment in a time period from the $j^{th}$ correction moment to the $(j-1)^{th}$ correction moment and that is of the sensor on an $n^{th}$ coordinate axis of the ground coordinate system, so that at the $j^{th}$ correction moment, a corrected velocity of the sensor on the $n^{th}$ coordinate axis of the ground coordinate system is 0, where j is an integer greater than 0, and a value of n is 1, 2, or 3. The correction moment is a moment that is corresponding to a minimum value of a velocity of the sensor on the second coordinate axis of the ground coordinate system and that is in preset duration including a foot landing moment. The foot landing moment is a moment corresponding to a maximum value of magnitude of a vector represented by the measured value of the accelerometer.

With reference to the second aspect and the foregoing possible implementations, in another possible implementation, the processor is further configured to: after the $j^{th}$ correction moment, calculate, based on a corrected velocity that is corresponding to each sampling moment in the time period from the $j^{th}$ correction moment to the $(j-1)^{th}$ correction moment and that is of the sensor on the $n^{th}$ coordinate axis of the ground coordinate system, a distance of the sensor on the $n^{th}$ coordinate axis of the ground coordinate system in the time period from the $j^{th}$ correction moment to the $(j-1)^{th}$ correction moment; and calculate a total distance that is corresponding to the $j^{th}$ correction moment and that is of the sensor in the ground coordinate system, based on the distance of the sensor on the $n^{th}$ coordinate axis of the ground coordinate system in the time period from the $j^{th}$ correction moment to the $(j-1)^{th}$ correction moment, and a total distance that is corresponding to the $(j-1)^{th}$ correction moment and that is of the sensor in the ground coordinate system.

With reference to the second aspect and the foregoing possible implementations, in another possible implementation, the processor is further configured to: construct a rotation matrix after the $j^{th}$ correction moment; and multiply the rotation matrix by the attitude matrix corresponding to the $i^{th}$ sampling moment, to obtain a corrected attitude matrix corresponding to the $i^{th}$ sampling moment. The correction moment is a moment that is corresponding to the minimum value of the velocity of the sensor on the second coordinate axis of the ground coordinate system and that is in the preset duration including the foot landing moment. The foot landing moment is a moment corresponding to the maximum value of the magnitude of the vector represented by the measured value of the accelerometer. The rotation matrix is shown in the following expression 5:

$$C = \begin{bmatrix} 1 & 0 & 0 \\ 0 & \cos\theta & \sin\theta \\ 0 & -\sin\theta & \cos\theta \end{bmatrix},$$

where C indicates the rotation matrix, and θ indicates a rotation angle.

With reference to the second aspect and the foregoing possible implementations, in another possible implementation, the processor is specifically configured to: calculate, based on the measured value of the accelerometer that is corresponding to the $i^{th}$ sampling moment, the attitude matrix corresponding to the $i^{th}$ sampling moment, and an expression 1, the acceleration that is corresponding to the $i^{th}$ sampling moment and that is of the sensor in the ground coordinate system. The expression 1 is as follows:

$$\begin{bmatrix} a_{g,i}^1 \\ a_{g,i}^2 \\ a_{g,i}^3 \end{bmatrix} = R_{s,i}^g \begin{bmatrix} a_{g,i}^1 \\ a_{g,i}^2 \\ a_{g,i}^3 \end{bmatrix} - \begin{bmatrix} 0 \\ 0 \\ a_z \end{bmatrix},$$

where $$\begin{bmatrix} a_{g,i}^1 \\ a_{g,i}^2 \\ a_{g,i}^3 \end{bmatrix}$$

indicates the acceleration that is corresponding to the $i^{th}$ sampling moment and that is of the sensor in the ground coordinate system, $R_{s,i}^g$ indicates the attitude matrix corresponding to the $i^{th}$ sampling moment, $$\begin{bmatrix} a_{s,i}^1 \\ a_{s,i}^2 \\ a_{s,i}^3 \end{bmatrix}$$

indicates the measured value of the accelerometer that is corresponding to the $i^{th}$ sampling moment, and $a_z$ indicates gravity acceleration.

With reference to the second aspect and the foregoing possible implementations, in another possible implementation, the processor is specifically configured to: when a fluctuation range of the measured value of the accelerometer is greater than or equal to a first preset value, calculate a first vector based on the measured value of the gyroscope and according to a principal component analysis method, where the first vector is a vector representation of the first coordinate axis of the foot coordinate system in the sensor coordinate system; when a fluctuation range of a measured value of the accelerometer in a consecutive time period Q is less than the first preset value, calculate a second vector based on the measured value of the accelerometer in the consecutive time period Q, where the second vector is a vector representation of the third coordinate axis of the foot coordinate system in the sensor coordinate system, and the second vector is a unit vector; calculate a third vector based on the first vector and the second vector, where the third vector is a vector representation of the second coordinate axis of the foot coordinate system in the sensor coordinate system, and the third vector is perpendicular to the first vector and the second vector; and construct the first coordinate transformation matrix by using the first vector, the second vector, and the third vector.

With reference to the second aspect and the foregoing possible implementations, in another possible implementation, the processor is specifically configured to: calculate the second vector based on an average value of the measured value of the accelerometer in the consecutive time period Q.

With reference to the second aspect and the foregoing possible implementations, in another possible implementation, the processor is specifically configured to: calculate, based on the angular velocity that is corresponding to the $i^{th}$ sampling moment and that is of the sensor in the foot coordinate system, a sampling interval of the sensor, and an expression 2 or an expression 3, the second coordinate transformation matrix corresponding to the $i^{th}$ sampling moment. The expression 2 is as follows:

$$R_{f,i}^g = R_{f,i-1}^g \exp\left(\begin{bmatrix} 0 & -w_{f,i}^3 & w_{f,i}^2 \\ w_{f,i}^3 & 0 & -w_{f,i}^1 \\ -w_{f,i}^2 & w_{f,i}^1 & 0 \end{bmatrix} \cdot T_0\right);$$

and
the expression 3 is as follows:

$$R_{f,i}^g = R_{f,i-1}^g \begin{bmatrix} 1 & 0 & 0 \\ 0 & \cos(T_0 \cdot w_{f,i}^1) & -\sin(T_0 \cdot w_{f,i}^1) \\ 0 & \sin(T_0 \cdot w_{f,i}^1) & \cos(T_0 \cdot w_{f,i}^1) \end{bmatrix},$$

where $R_{f,i}^g$ indicates the second coordinate transformation matrix corresponding to the $i^{th}$ sampling moment, $R_{f,i-1}^g$ indicates a second coordinate transformation matrix corresponding to the $(i-1)^{th}$ sampling moment, exp( ) indicates an exponential function using a natural constant e as a base, $T_0$ indicates the sampling interval of the sensor, $w_{f,i}^1$ indicates an angular velocity at which the sensor rotates around the second coordinate axis of the foot coordinate system at the $i^{th}$ sampling moment, $w_{f,i}^2$ indicates an angular velocity at which the sensor rotates around the third coordinate axis of the foot coordinate system at the $i^{th}$ sampling moment, and $w_{f,i}^3$, indicates an angular velocity at which the sensor rotates around the first coordinate axis of the foot coordinate system at the $i^{th}$ sampling moment.

With reference to the second aspect and the foregoing possible implementations, in another possible implementation, the processor is specifically configured to: separately correct, based on an expression 4, the velocity that is corresponding to each sampling moment in the time period from the $j^{th}$ correction moment to the $(j-1)^{th}$ correction moment and that is of the sensor on the $n^{th}$ coordinate axis of the ground coordinate system. The expression 4 is as follows:

$$\bar{v}_g^k(t_i) = v_g^k(t_i) - (t_i - t^{j-1})\frac{v_g^k(t^j) - v_g^k(t^{j-1})}{t^j - t^{j-1}} - v_g^k(t^{j-1}), t \in [t^{j-1}, t^j],$$

where $t^j$ indicates the $j^{th}$ correction moment, $t^{j-1}$ indicates the $(j-1)^{th}$ correction moment, $v_g^k(t_i)$ indicates a velocity that is corresponding to the sampling moment and that is $i^{th}$ of the sensor on the $n^{th}$ coordinate axis of the ground coordinate system, $\bar{v}_g^k(t_i)$ indicates a corrected velocity that is corresponding to the $i^{th}$ sampling moment and that is of the sensor on the $n^{th}$ coordinate axis of the ground coordinate system, $v_g^k(t^j)$ indicates a velocity that is corresponding to the correction moment and that is of the sensor on the $n^{th}$ coordinate axis of the ground coordinate system, and $v_g^k(t^{j-1})$ indicates a velocity that is corresponding to the $(j-1)^{th}$ correction moment and that is of the sensor on the $n^{th}$ coordinate axis of the ground coordinate system.

With reference to the second aspect and the foregoing possible implementations, in another possible implementation, the processor is specifically configured to: calculate a rotation angle in the rotation matrix based on at least one of distances of the sensor on the second coordinate axis and the third coordinate axis of the ground coordinate system in the time period from the $j^{th}$ correction moment to the $(j-1)^{th}$ correction moment, or a velocity of the sensor on the second coordinate axis of the ground coordinate system at the $j^{th}$ correction moment; and construct the rotation matrix based on the rotation angle and the expression 5. The rotation angle $\theta$ is a first rotation angle $\theta_1$ in an expression 6, a second rotation angle $\theta_2$ in an expression 7, or a third rotation angle $\theta_3$ in an expression 8. The expression 6 is as follows:

$$\theta_1 = \arctan\left(\frac{l_g^3}{l_g^2}\right);$$

the expression 7 is as follows:

$$\theta_2 = \arctan\left(\frac{v_{g\_min}^2}{T \cdot a_z}\right);$$

and
the expression 8 is as follows:

$$\theta_3 = k\theta_1 + (1-k)\theta_2, 0 \le k \le 1,$$

where arctan indicates arc tangent, $l_g^3$ indicates the distance of the sensor on the third coordinate axis of the ground coordinate system in the time period from the $j^{th}$ correction moment to the $(j-1)^{th}$ correction moment, $l_g^2$ indicates the distance of the sensor on the second coordinate axis of the ground coordinate system in the time period from the $j^{th}$ correction moment to the $(j-1)^{th}$ correction moment, $v_{g\_min}^2$ indicates the velocity that is corresponding to the $j^{th}$ correction moment and that is of the sensor on the second coordinate axis of the ground coordinate system, $a_z$ indicates the gravity acceleration, and $T_1$ indicates the time period from the $j^{th}$ correction moment to the $(j-1)^{th}$ correction moment.

A third aspect provides a method. When a portable device detects that the portable device is put on an arm, a hand, or a wrist, the portable device automatically calculates a walking or running distance by using a first algorithm, and when the portable device detects viewing of a user, the portable device displays a step counting result and identifies that the step counting result is obtained when the portable device is put on the arm, the hand, or the wrist; or when the portable device detects that the portable device is put on an ankle, a shank, or a foot, the portable device automatically calculates a walking or running distance by using a second algorithm, and when the portable device detects viewing of a user, the portable device displays a step counting result and identifies that the step counting result is obtained when the portable device is put on the ankle, the shank, or the foot. The second algorithm is the method provided in the first aspect and any implementation. The first algorithm may be a general algorithm, or a step counting algorithm applicable when the portable device is put on the arm, the hand, or the wrist. This method can provide the user with novel experience.

With reference to the third aspect and the foregoing possible implementation, in another possible implementation, the first algorithm may be alternatively the same as the second algorithm.

With reference to the third aspect and the foregoing possible implementation, in another possible implementation, when the portable device detects that the portable device is put on a neck, the portable device automatically calculates a walking or running distance by using a third algorithm. When the portable device detects viewing of the user, the portable device displays a step counting result and identifies that the step counting result is obtained when the portable device is put on the neck. The third algorithm may be a general algorithm, or a step counting algorithm applicable when the portable device is put on the neck. This method can provide the user with novel experience.

With reference to the third aspect and the foregoing possible implementations, in another possible implementation, the third algorithm may be alternatively the same as the first algorithm.

With reference to the third aspect and the foregoing possible implementations, in another possible implementation, when the portable device detects that the portable device is put on the ankle, the shank, or the foot, the portable device automatically disables a module for detecting a physiological parameter such as blood pressure and/or a heartbeat. According to this implementation, unnecessary power consumption is avoided, and an operating time of the portable device is increased.

With reference to the third aspect and the foregoing possible implementations, in another possible implementation, when the portable device detects that the portable device is put on the neck, the portable device automatically disables a module for detecting a physiological parameter such as blood pressure and/or a heartbeat. According to this implementation, unnecessary power consumption is avoided, and an operating time of the portable device is increased.

According to a fourth aspect, an embodiment of this application provides a portable device, including a sensor, a processor, and a memory. The sensor includes a gyroscope and an accelerometer. The memory is configured to store an instruction. The processor is configured to execute the instruction, so that the portable device performs the attitude matrix calculation method in any implementation of the first aspect or any implementation of the third aspect.

According to a fifth aspect, an embodiment of this application provides a computer readable storage medium including an instruction. When the instruction runs on a portable device, the portable device is enabled to perform the attitude matrix calculation method in any implementation of the first aspect.

According to a sixth aspect, an embodiment of this application provides a computer program product including an instruction. When the computer program product runs on a portable device, the portable device is enabled to perform the attitude matrix calculation method in any implementation of the first aspect or any implementation of the third aspect.

According to a seventh aspect, an embodiment of this application provides a device. The device exists in a product form of a chip. A structure of the device includes a processor and a memory. The memory is configured to be coupled to the processor and is configured to store a program instruction and data of the device. The processor is configured to execute the program instruction stored in the memory, so that the device performs a data processing function in the attitude matrix calculation method in any implementation of the first aspect.

With reference to any one of the foregoing aspects and possible implementations, in another possible implementation, the sensor coordinate system, the foot coordinate system, and the ground coordinate system each are a rectangular coordinate system.

BRIEF DESCRIPTION OF DRAWINGS

FIG. 6A is a flowchart of an attitude matrix calculation method according to an embodiment of this application;

FIG. 6B is a flowchart of another attitude matrix calculation method according to an embodiment of this application;

FIG. 9B is a schematic diagram of a left-hand rectangular coordinate system according to an embodiment of this application;

DESCRIPTION OF EMBODIMENTS

In an existing attitude matrix calculation method, an algorithm for performing convergence on real-time measured values of sensors such as a gyroscope, an accelerometer, and a magnetometer is relatively complex, and complex processes such as matrix inversion and covariance matrix calculation are performed. Therefore, a calculation amount is large, and both power consumption and memory usage of a portable device are relatively large. Embodiments of this application provide an optimized attitude matrix calculation method and a device. A real-time attitude matrix can be calculated based on a constant matrix and a real-time measured value of a gyroscope, without a need of calculating the real-time attitude matrix with reference to real-time measured values of an accelerometer and a magnetometer. Therefore, complex convergence on the real-time measured value of the gyroscope and the real-time measured value of the accelerometer or the magnetometer is not required, and complex matrix inversion and covariance matrix calculation, and the like in a convergence process are not required. This can reduce a calculation amount, reduce power consumption of a device, and save memory of the device.

For ease of understanding, some concepts related to the embodiments of this application are described as examples for reference, as illustrated below:

Portable device: including but not limited to a mobile phone, a tablet computer (for example, an iPad), and a personal digital assistant (personal digital assistant, PDA), a wearable device (including but not limited to a smartwatch, a smart band, a sports band, and the like).

Wearable device: a portable device that is directly put on a human body or is integrated with clothing or an accessory of a user.

Principal component analysis (principal component analysis, PCA) method: a statistical method in which a group of possibly correlated variables are converted into a group of linearly non-correlated variables through orthogonal transformation, where the group of variables obtained through conversion may be referred to as a principal component.

The following describes the technical solutions in the embodiments of this application with reference to the accompanying drawings in the embodiments of this application. In descriptions in the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

Figure 1:
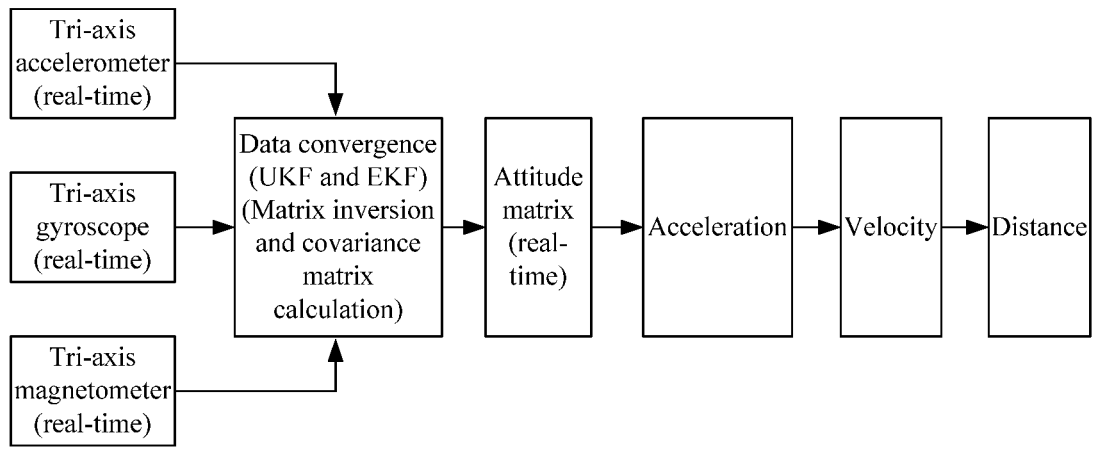
FIG. 1 is a flowchart of an attitude matrix calculation method in the prior art.
Figure 2A:
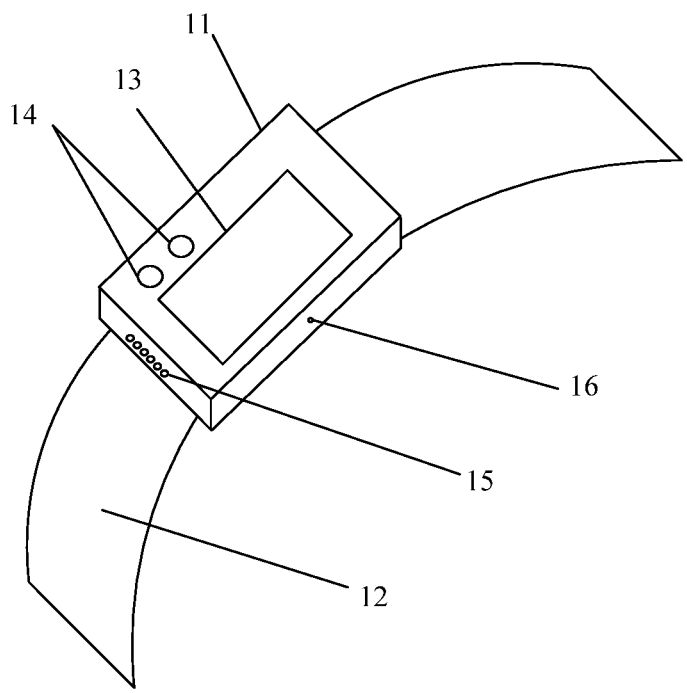
FIG. 2A is a schematic diagram of appearance of a wearable device according to an embodiment of this application.

A portable device included in the embodiments of this application may be configured to sense a motion status of a user. The portable device includes but is not limited to a device such as a mobile phone, a tablet computer, a wearable device, or a personal digital assistant. For example, when the portable device is a wearable device, FIG. 2A provides a schematic diagram of appearance of a wearable device 10. The wearable device 10 may include a main body 11 and a connecting piece 12. The main body 11 may include a screen 13, a button 14, and the like. The screen 13 may be configured to prompt various types of information to a user, for example, a time, a motion velocity, a motion distance, and consumed calories. When the screen 13 is a touchscreen, the screen 13 and the button 14 may be configured to input user instruction information, for example, power-on, power-off, or pause. The connecting piece 12 may be configured to dispose the wearable device on a part of a body of the user. The main body 11 may further include parts such as an earpiece 15 and a microphone 16, which may be configured to emit a voice prompt, play music, input a voice instruction of the user, and the like. In addition, it can be understood that the main body 11 may further include other parts, such as a USB port.

Figure 2B:
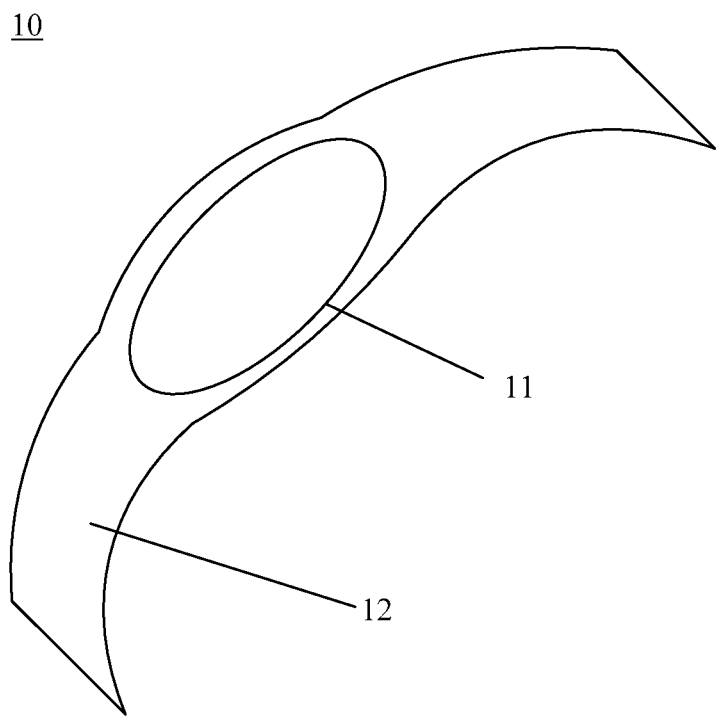
FIG. 2B is a schematic diagram of appearance of another wearable device according to an embodiment of this application.

FIG. 2A provides the wearable device 10 whose appearance is similar to that of a watch. The wearable device 10 may be alternatively in another form. This is not specifically limited in the embodiments of this application. For example, the wearable device 10 may be alternatively a ring apparatus shown in FIG. 2B. The connecting piece 12 may be specifically a fastener, and may be configured to fasten the wearable device 10 to a part such as a wrist, an ankle, an arm, or a leg; or the connecting piece 12 may be a fixing band, and may fix the wearable device 10 to a part such as a wrist, an ankle, an arm, or a leg.

Figure 2C:
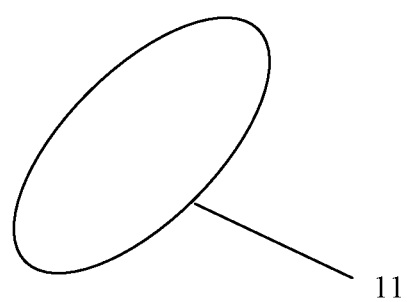
FIG. 2C is a schematic diagram of a main body according to an embodiment of this application.
Figure 2D:
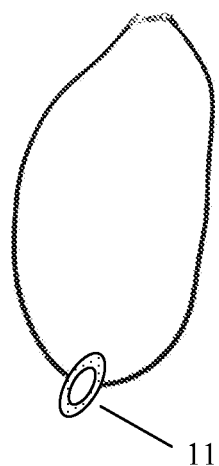
FIG. 2D is a schematic diagram of another main body according to an embodiment of this application.
Figure 2E:
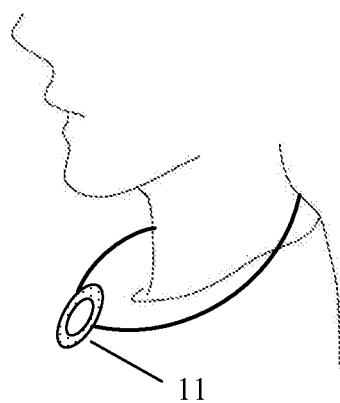
FIG. 2E is a schematic diagram of another main body according to an embodiment of this application.

In addition, referring to FIG. 2C, the main body 11 may be alternatively separated from the connecting piece 12 and used independently. For example, the main body 11 may be placed in a pocket or held in hand. In addition, the main body 11 may be alternatively used as a decoration and put on a position such as a neck, an ankle, a wrist, a waist, or clothing of the user. For example, referring to FIG. 2D and FIG. 2E, the main body 11 is in a ring shape, and may be used as a necklace and put on the neck of the user. Specifically, when the main body 11 is used only as a decoration, an optimization algorithm (an attitude matrix calculation algorithm, a distance calculation algorithm, or the like) and other functions (for example, a timing function) provided in the embodiments of this application may not be enabled. When the main body 11 is triggered, the optimization algorithm provided in the embodiments of this application may be enabled, and the other functions may also be enabled. The main body 11 may be triggered in many manners. For example, the main body 11 may be triggered when it is detected that the main body 11 is put on a predetermined part, when the main body 11 is shaken continuously, or when the main body 11 is touched continuously.

Figure 2F:
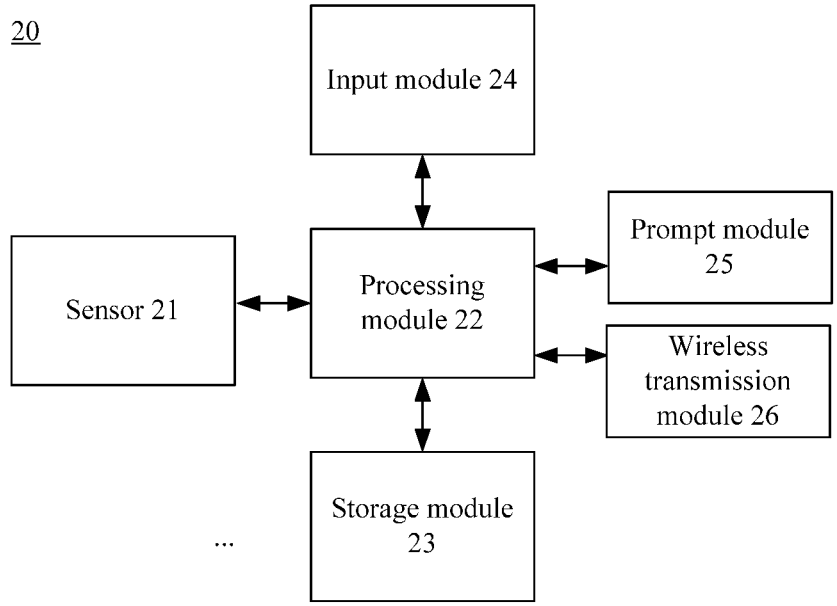
FIG. 2F is a schematic structural diagram of a wearable device according to an embodiment of this application.

FIG. 2F provides a schematic structural diagram of another wearable device 20. Referring to FIG. 2F, the wearable device 20 may include a sensor 21, a processing module 22, a storage module 23, an input module 24, a prompt module 25, and the like. The sensor 21 may be configured to monitor a real-time status of the wearable device 20, and may specifically include an accelerometer, a gyroscope, or the like. The processing module 22 may be configured to process detection data of the sensor 21. The storage module 23 may be configured to store the detection data of the sensor 21, store detection data processed by the processing module 22, and store a control instruction. The input module 24 may be configured to receive instruction information input by a user, for example, may be the screen 13, the button 14, or the microphone 16 in FIG. 2A. The prompt module 25 may be configured to display various types of prompt information to the user, for example, may be the screen 13 or the earpiece 15 in FIG. 2A. In addition, the wearable device 20 may further include other modules, for example, a wireless transmission module 26.

Figure 3:
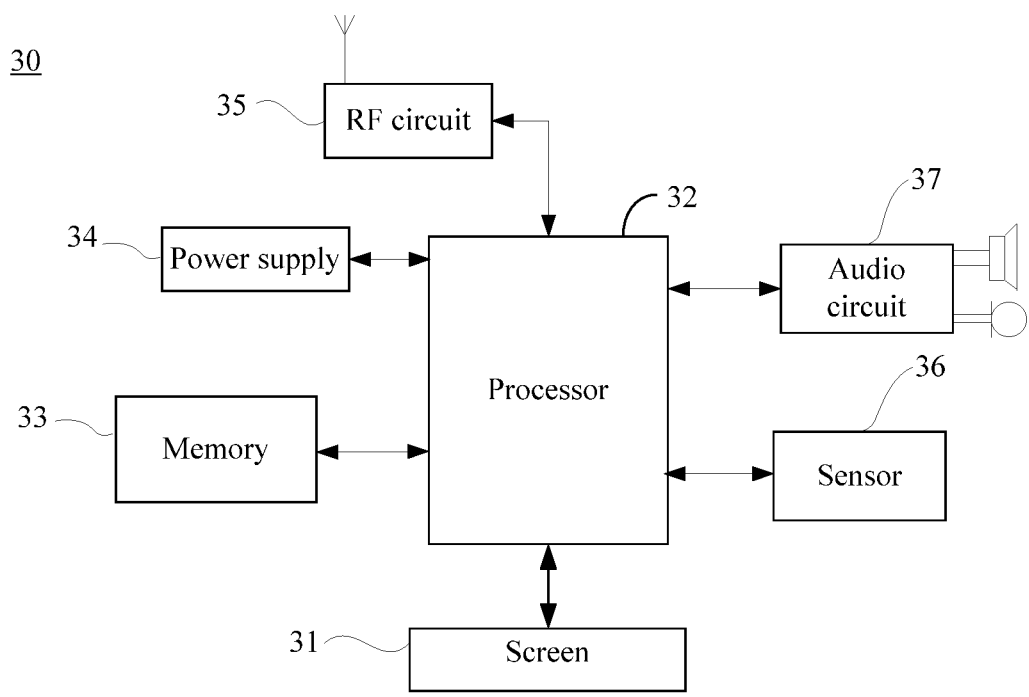
FIG. 3 is a schematic structural diagram of a mobile phone according to an embodiment of this application.

When the portable device is a mobile phone, FIG. 3 provides a schematic structural diagram of a mobile phone 30. The mobile phone 30 may include parts such as a screen 31, a processor 32, a memory 33, a power supply 34, a radio frequency (radio frequency, RF) circuit 35, a sensor 36, and an audio circuit 37. These parts may be connected to each other by using a bus, or may be directly connected. A person skilled in the art can understand that the mobile phone structure shown in FIG. 3 does not constitute a limitation on the mobile phone. The mobile phone may include more or fewer parts than those shown in the figure, or a combination of some parts, or parts disposed differently.

The screen 31 may be specifically a touch display screen or a non-touch display screen, and may be configured to display a user interface. The processor 32 is a control center of the mobile phone 30, connects various parts of the entire mobile phone by using various interfaces and lines, and performs various functions and data processing of the mobile phone 30 by running or executing a software program and/or a module stored in the memory 33 and invoking data stored in the memory 33, so as to perform overall monitoring on the mobile phone 30. The memory 33 may be configured to store the data, the software program, and the module. The power supply 34 may be logically connected to the processor 32 by using a power management system, so as to use the power management system to implement functions such as charging management, discharging management, and power consumption management. The RF circuit 35 may be configured to send/receive information, or send/receive a signal in a call process. The sensor 36 may include an accelerometer. The accelerometer is configured to collect values of acceleration of the mobile phone in various directions (there are usually three axes), may collect a value and a direction of gravity when the mobile phone is still, and may be applied to an application (for example, landscape/portrait mode switching, a related game, or magnetometer posture calibration) for recognizing a posture of the mobile phone, a function (for example, a pedometer or a keystroke) related to vibration recognition, and the like. The sensor 36 may further include another sensor such as a pressure sensor, an optical sensor, a gyroscope, a barometer, a hygrometer, a thermometer, or an infrared sensor. The audio circuit 37 may be configured to provide an audio interface between a user and the mobile phone 30. Although not shown, the mobile phone 30 may further include a functional module such as a global positioning system (global positioning system, GPS) module, a wireless fidelity (wireless fidelity, Wi-Fi) module, a Bluetooth module, or a camera. Details are not described herein one by one.

It should be understood that structures of the tablet computer and the personal digital assistant are similar to the structure of the mobile phone in FIG. 3. Details are not described herein again.

To make the objectives, technical solutions, and advantages of the embodiments of this application clearer, the following describes in detail an attitude matrix calculation method provided in the embodiments of this application with reference to the specific parts in the wearable device shown in FIG. 2A and FIG. 2F.

In the embodiments of this application, the wearable device may be put on a part such as an ankle, a foot, or a shank of a user. For example, a schematic diagram of putting the wearable device on the ankle of the user may be shown in FIG. 4A, a schematic diagram of putting the wearable device on the foot of the user may be shown in FIG. 4B, and a schematic diagram of putting the wearable device on the shank of the user may be shown in FIG. 4C.

Figure 4A:
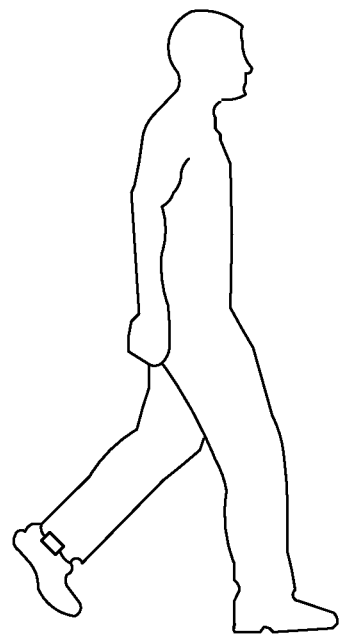
FIG. 4A is a schematic diagram of wearing a wearable device according to an embodiment of this application.
Figure 4B:
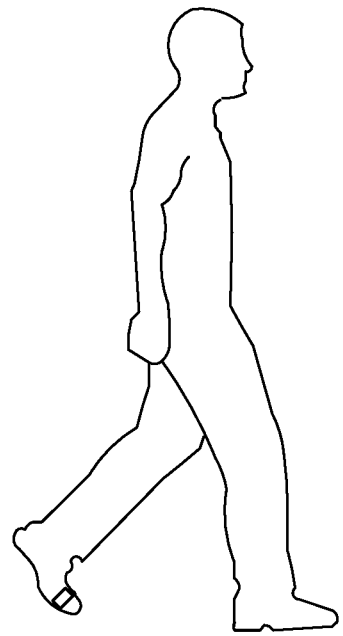
FIG. 4B is a schematic diagram of wearing another wearable device according to an embodiment of this application.
Figure 4C:
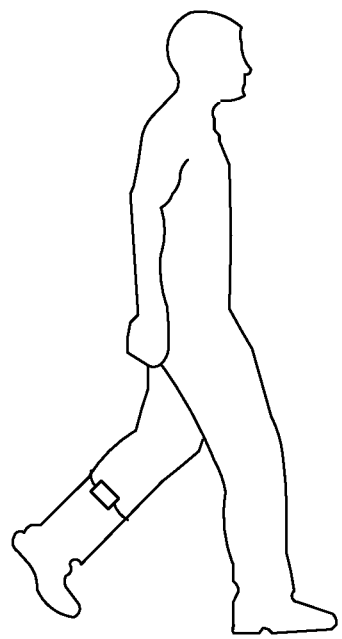
FIG. 4C is a schematic diagram of wearing another wearable device according to an embodiment of this application.

The following embodiments of this application are described by using the case of putting the wearable device on the shank of the user in FIG. 4A as an example. It should be understood that the foregoing portable device may be completely substituted for the wearable device to be applied to any technical solution described below. The case of putting the wearable device on the ankle or the foot of the user is similar to the case of putting the wearable device on the shank, and is not described in detail again in the embodiments of this application.

Figure 5A:
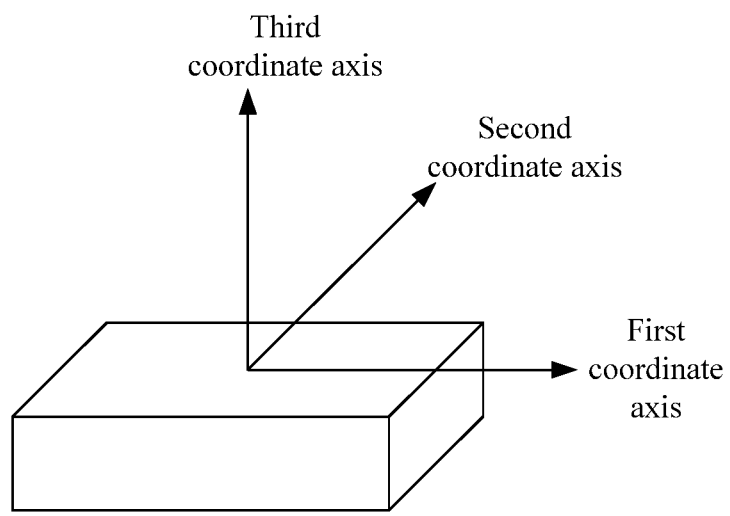
FIG. 5A is a schematic diagram of a sensor coordinate system according to an embodiment of this application.
Figure 5B:
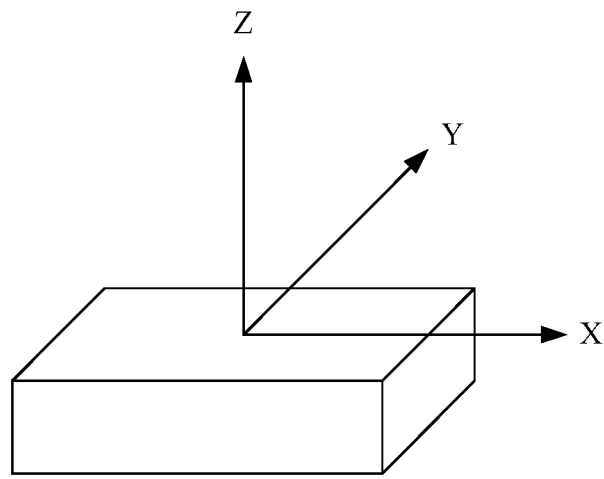
FIG. 5B is a schematic diagram of another sensor coordinate system according to an embodiment of this application.
Figure 5C:
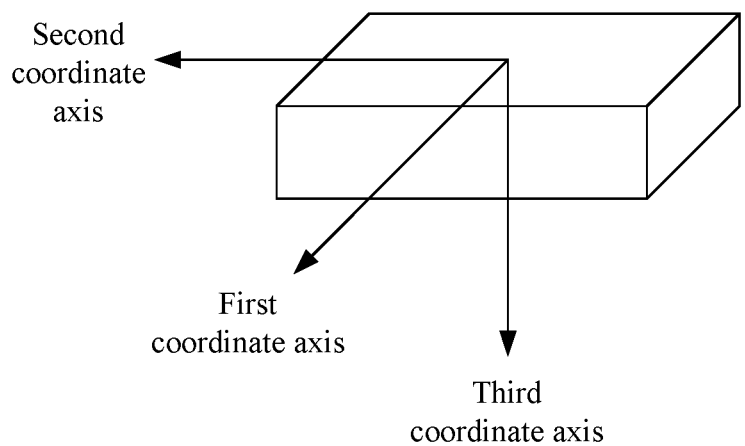
FIG. 5C is a schematic diagram of another sensor coordinate system according to an embodiment of this application.

In the embodiments of this application, the sensor in the wearable device may include a gyroscope, which may be specifically a tri-axis gyroscope, that is, a measured value of the gyroscope may include three components respectively corresponding to three coordinate axes. The attitude matrix calculation method provided in the embodiments of this application is related to a sensor coordinate system, a foot coordinate system, and a ground coordinate system. The sensor coordinate system is usually a coordinate system defined when the sensor is delivered out of a factory, or may be a coordinate system obtained by simply transforming a coordinate system defined when the sensor is delivered out of a factory. This is not specifically limited herein. For example, for a manner of defining the sensor coordinate system, refer to FIG. 5A, FIG. 5B, FIG. 5C, or the like. The foot coordinate system is defined based on directions of a foot and a shank. The ground coordinate system is a coordinate system fixed on the earth surface.

Referring to FIG. 6A and FIG. 6B, an attitude matrix calculation method provided in an embodiment of this application may mainly include the following steps.

Step 101: A wearable device calculates, based on a first coordinate transformation matrix and a measured value of a gyroscope that is corresponding to a sampling moment (for example, the $i^{th}$ sampling moment, where i is an integer greater than 0), a second coordinate transformation matrix corresponding to the sampling moment, where the first coordinate transformation matrix is a constant matrix.

The first coordinate transformation matrix is a coordinate transformation matrix between a sensor coordinate system and a foot coordinate system. In this embodiment of this application, the foot coordinate system is defined based on directions of a foot and a shank of a user. In a moving process of the user, when the wearable device is put on an ankle, the foot, or the shank of the user, a sensor is fixed relative to the wearing part, and a location of the sensor in a ground coordinate system varies with a location of the wearing position such as the ankle, the foot, or the shank. The sensor coordinate system is fixed relative to the foot coordinate system. The coordinate transformation matrix between the sensor coordinate system and the foot coordinate system is a constant matrix. The second coordinate transformation matrix is a coordinate transformation matrix between the foot coordinate system and the ground coordinate system. The coordinate transformation matrix between the foot coordinate system and the ground coordinate system is a matrix that varies with time in real time.

In the wearable device, the gyroscope in the sensor may collect a measured value at each sampling moment in real time based on preset sampling frequency or a preset sampling interval. At each sampling moment, the wearable device may calculate, based on the first coordinate transformation matrix and a measured value of the gyroscope that is collected at the sampling moment, a second coordinate transformation matrix corresponding to the sampling moment. Because the first coordinate transformation matrix is a constant matrix, the wearable device can calculate, based on the constant matrix and a measured value of the gyroscope that is corresponding to each sampling moment, a second coordinate transformation matrix corresponding to each sampling moment.

To be specific, the wearable device may calculate a coordinate transformation matrix that is corresponding to each sampling moment and that is between the foot coordinate system and the ground coordinate system, based on the constant matrix, that is, the coordinate transformation matrix between the sensor coordinate system and the foot coordinate system, and the measured value of the gyroscope that is corresponding to each sampling moment.

For the $i^{th}$ sampling moment, the wearable device may calculate a coordinate transformation matrix that is corresponding to the $i^{th}$ sampling moment and that is between the foot coordinate system and the ground coordinate system, based on the coordinate transformation matrix between the sensor coordinate system and the foot coordinate system, and a measured value of the gyroscope that is corresponding to the $i^{th}$ sampling moment.

The following describes an example of calculating an attitude matrix corresponding to the $i^{th}$ sampling moment as an example. A process of calculating an attitude matrix corresponding to another sampling moment is similar to that of calculating the attitude matrix corresponding to the $i^{th}$ sampling moment, and details are not described in the embodiments of this application.

Step 102: The wearable device calculates, based on the first coordinate transformation matrix and a second coordinate transformation matrix corresponding to the $i^{th}$ sampling moment, the attitude matrix corresponding to the $i^{th}$ sampling moment.

The attitude matrix is a coordinate transformation matrix between the sensor coordinate system and the ground coordinate system. Same as the second coordinate transformation matrix, the attitude matrix is also a matrix that varies with time in real time.

After the second coordinate transformation matrix corresponding to the $i^{th}$ sampling moment is obtained through calculation, the wearable device may multiply the first coordinate transformation matrix by the second coordinate transformation matrix corresponding to the $i^{th}$ sampling moment, to obtain a real-time attitude matrix corresponding to the $i^{th}$ sampling moment, that is:

$$R_{s,i}^g = R_{f,i}^g R_s^f \qquad \text{Expression 1.}$$

In the expression 1, $R_s^f$ indicates the first coordinate transformation matrix, $R_{f,i}^g$ indicates the second coordinate transformation matrix corresponding to the $i^{th}$ sampling moment, and $R_{s,i}^g$ indicates the attitude matrix corresponding to the $i^{th}$ sampling moment.

To be specific, the wearable device may calculate the matrix that changes in real time, that is, the coordinate transformation matrix between the sensor coordinate system and the ground coordinate system, based on the constant matrix, that is, the coordinate transformation matrix between the sensor coordinate system and the foot coordinate system, and the matrix that changes in real time, that is, the coordinate transformation matrix between the foot coordinate system and the ground coordinate system.

With reference to step 101 and step 102, it can be learned that the wearable device may calculate the coordinate transformation matrix that changes in real time and that is between the sensor coordinate system and the ground coordinate system, based on the constant matrix, that is, the coordinate transformation matrix between the sensor coordinate system and the foot coordinate system, and a real-time measured value of the gyroscope.

It can be learned that according to the method provided in the embodiments of this application, the real-time attitude matrix can be calculated based on the real-time measured value of the gyroscope, without a need of calculating the real-time attitude matrix with reference to real-time measured values of an accelerometer and a magnetometer. Therefore, complex convergence on the real-time measured value of the gyroscope and a real-time measured value of a sensor such as the accelerometer or the magnetometer is not required, and complex matrix inversion and covariance matrix calculation, and the like in a convergence process are not required. This can reduce a calculation amount in an attitude matrix calculation process, reduce power consumption of the wearable device, and save memory of the wearable device.

Specifically, in a case, the attitude matrix may be a first attitude matrix. The first attitude matrix is a coordinate transformation matrix from the sensor coordinate system to the ground coordinate system. The first coordinate transformation matrix may be a coordinate transformation matrix from the sensor coordinate system to the foot coordinate system. The second coordinate transformation matrix may be a coordinate transformation matrix from the foot coordinate system to the ground coordinate system.

In another case, the attitude matrix may be alternatively a second attitude matrix. The second attitude matrix may be a coordinate transformation matrix from the ground coordinate system to the sensor coordinate system. The second attitude matrix is an inverse matrix or a transposed matrix of the first attitude matrix.

The following embodiments of this application are described by using an example in which the attitude matrix is the first attitude matrix.

Figure 7A:
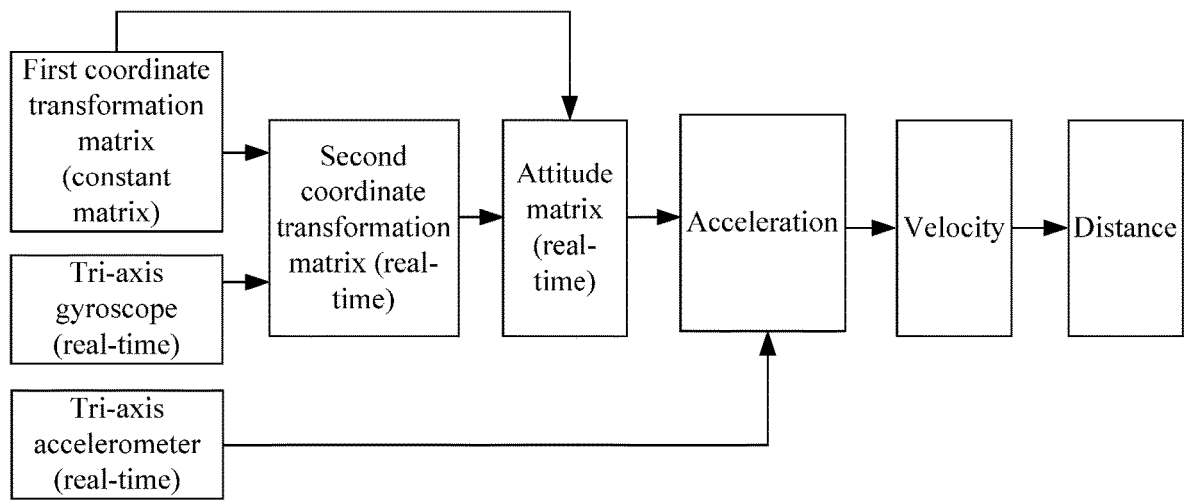
FIG. 7A is a flowchart of a distance calculation method according to an embodiment of this application.
Figure 7B:
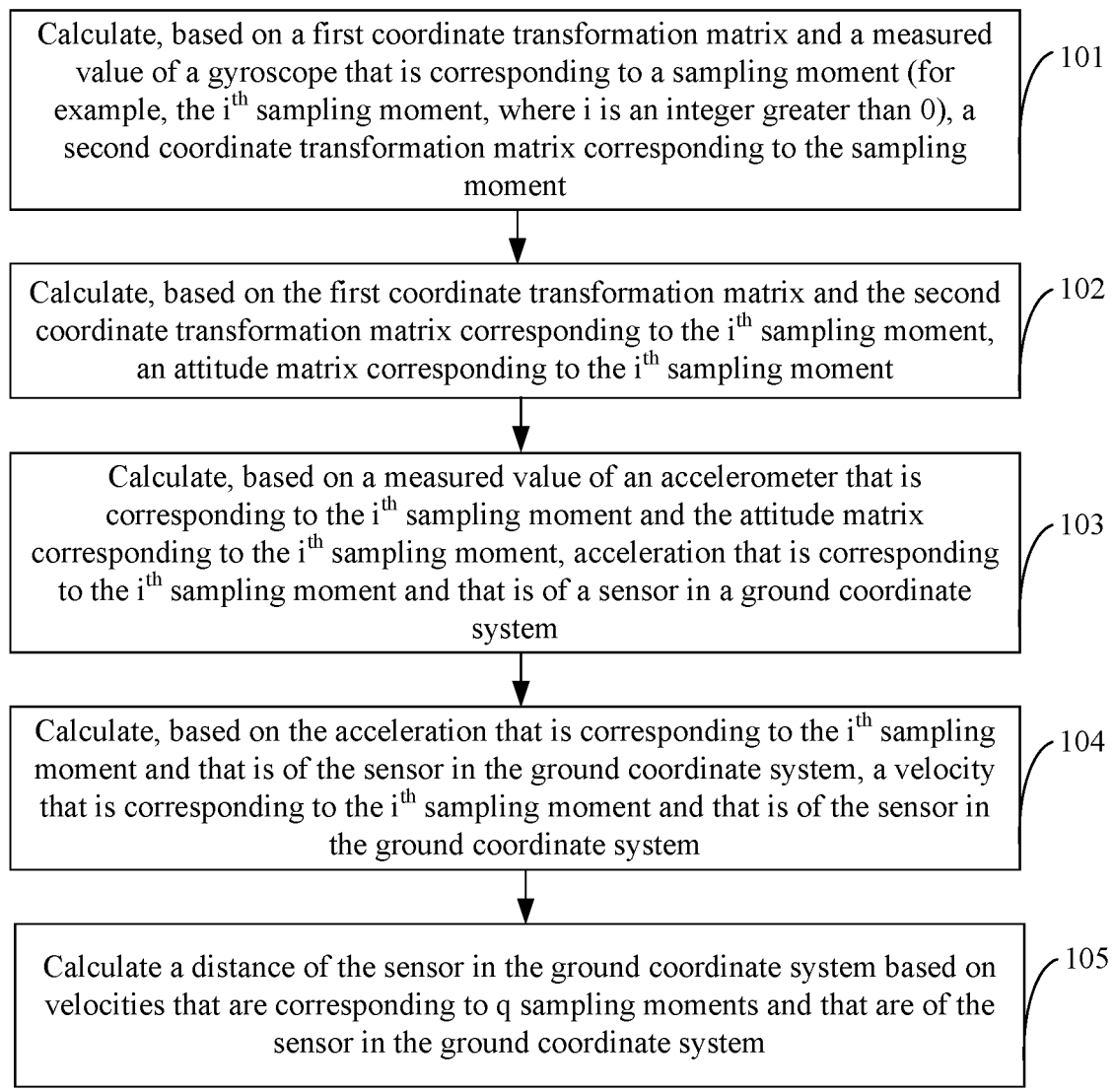
FIG. 7B is a flowchart of another distance calculation method according to an embodiment of this application.

Further, in the wearable device, the sensor may further include an accelerometer. The accelerometer may be specifically a tri-axis accelerometer, that is, a measured value of the accelerometer includes three components corresponding to three axes. Referring to FIG. 7a and FIG. 7B, after step 102, the method may further include the following steps.

Step 103: The wearable device calculates, based on a measured value of the accelerometer that is corresponding to the $i^{th}$ sampling moment and the attitude matrix corresponding to the $i^{th}$ sampling moment, acceleration that is corresponding to the $i^{th}$ sampling moment and that is of the sensor in the ground coordinate system.

After the second coordinate transformation matrix corresponding to the $i^{th}$ sampling moment is obtained in step 102, in step 103, the wearable device may calculate the acceleration of the sensor in the ground coordinate system based on the real-time measured value of the accelerometer at the $i^{th}$ sampling moment.

Specifically, the wearable device may calculate, based on the following expression 1, the acceleration that is corresponding to the $i^{th}$ sampling moment and that is of the sensor in the ground coordinate system:

$$\begin{bmatrix} a_{g,i}^1 \\ a_{g,i}^2 \\ a_{g,i}^3 \end{bmatrix} = R_{si}^g \begin{bmatrix} a_{s,i}^1 \\ a_{s,i}^2 \\ a_{s,i}^3 \end{bmatrix} - \begin{bmatrix} 0 \\ 0 \\ a_z \end{bmatrix}$$   Expression 1

In the expression 1, $$\begin{bmatrix} a_{g,i}^1 \\ a_{g,i}^2 \\ a_{g,i}^3 \end{bmatrix}$$

indicates the acceleration that is corresponding to the $i^{th}$ sampling moment and that is of the sensor in the ground coordinate system, $a_{g,i}^1$ indicates acceleration that is corresponding to the $i^{th}$ sampling moment and that is of the sensor on a first coordinate axis of the ground coordinate system, $a_{g,i}^2$ indicates acceleration that is corresponding to the $i^{th}$ sampling moment and that is of the sensor on a second coordinate axis of the ground coordinate system, $a_{g,i}^3$ indicates acceleration that is corresponding to the $i^{th}$ sampling moment and that is of the sensor on a third coordinate axis of the ground coordinate system, $R_{s,i}^g$ indicates the attitude matrix corresponding to the $i^{th}$ sampling moment, $$\begin{bmatrix} a_{s,i}^1 \\ a_{s,i}^2 \\ a_{s,i}^3 \end{bmatrix}$$

indicates the measured value of the accelerometer that is corresponding to the $i^{th}$ sampling moment, $a_s^1$ indicates a measured value that is corresponding to the $i^{th}$ sampling moment and that is of the accelerometer on a first coordinate axis of the sensor coordinate system, $a_s^2$ indicates a measured value that is corresponding to the $i^{th}$ sampling moment and that is of the accelerometer on a second coordinate axis of the sensor coordinate system, $a_s^3$ indicates a measured value that is corresponding to the $i^{th}$ sampling moment and that is of the accelerometer on a third coordinate axis of the sensor coordinate system, and $a_z$ indicates gravity acceleration.

Because the attitude matrix is used to represent the coordinate transformation matrix from the sensor coordinate system to the ground coordinate system, in the expression 1, by multiplying the attitude matrix to the measured value of the accelerometer, acceleration of the accelerometer sensor in the sensor coordinate system may be converted into acceleration in the ground coordinate system, to obtain the acceleration of the sensor in the ground coordinate system. It should be noted that the measured value of the accelerometer includes a gravity acceleration component. Therefore, the gravity acceleration component needs to be further subtracted from the acceleration of the sensor in the ground coordinate system, to obtain motion acceleration of the user in the ground coordinate system.

Step 104: The wearable device calculates, based on the acceleration that is corresponding to the $i^{th}$ sampling moment and that is of the sensor in the ground coordinate system, a velocity that is corresponding to the $i^{th}$ sampling moment and that is of the sensor in the ground coordinate system.

In step 104, the wearable device may perform integration on the acceleration that is corresponding to the $i^{th}$ sampling moment and that is of the sensor in the ground coordinate system in step 103, to obtain the velocity that is corresponding to the $i^{th}$ sampling moment and that is of the sensor in the ground coordinate system. The velocity of the sensor in the ground coordinate system may be used to represent a velocity of the user in the ground coordinate system. Specifically, the wearable device may separately perform integration on acceleration on each coordinate axis, to obtain a corresponding velocity of the sensor on each coordinate axis of the ground coordinate system. The following describes an example of calculating a velocity on any coordinate axis of the ground coordinate system.

For example, in a calculation method, a velocity corresponding to the $1^{st}$ sampling moment after an initial moment may be an integral value, in a sampling interval, of acceleration corresponding to the $1^{st}$ sampling moment. Starting from the $2^{nd}$ sampling moment after the initial moment, a velocity corresponding to a current sampling moment may be a sum of a velocity corresponding to a previous sampling moment and an integral value, in a sampling interval, of acceleration corresponding to the current sampling moment. The initial moment may be a power-on moment of the wearable device.

Figure 8:
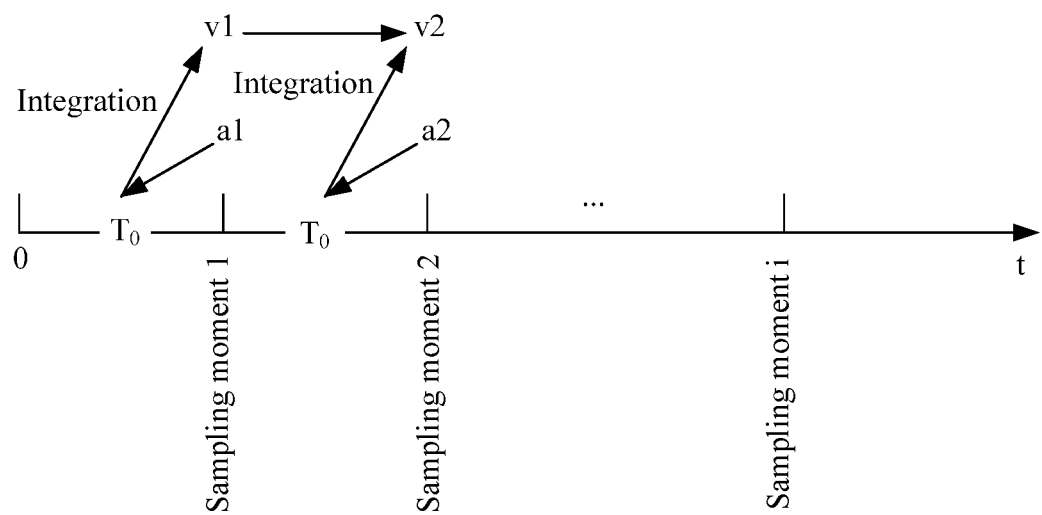
FIG. 8 is a diagram of a correspondence between a velocity and acceleration according to an embodiment of this application.

For example, referring to FIG. 8, a moment 0 is an initial moment, acceleration corresponding to a sampling moment 1 is a1, and acceleration corresponding to a sampling moment 2 is a2. For a velocity v1 corresponding to the sampling moment 1, the wearable device may perform integration on the acceleration a1 in a sampling interval T0 from the moment 0 to the sampling moment 1, to obtain the velocity v1 corresponding to the sampling moment 1. For a velocity v2 corresponding to the sampling moment 2, the wearable device may perform integration on the acceleration a2 in a sampling interval from the sampling moment 1 to the sampling moment 2, and add an obtained integral value to the velocity v1 corresponding to the sampling moment 1, to obtain the velocity v2 corresponding to the sampling moment 2.

Step 105: The wearable device calculates a distance of the sensor in the ground coordinate system based on velocities that are corresponding to q sampling moments and that are of the sensor in the ground coordinate system, where q is an integer greater than or equal to 2.

In step 105, the wearable device may perform integration on the velocities that are corresponding to the q sampling moments and that are of the sensor in the ground coordinate system in step 104, to obtain the motion distance of the sensor in the ground coordinate system. The motion distance of the sensor in the ground coordinate system may be used to represent a motion distance of the user in the ground coordinate system. Specifically, the wearable device may perform integration on velocities on each coordinate axis, to obtain a distance of the sensor that is corresponding to each coordinate axis of the ground coordinate system.

Furthermore, in the prior art, there is a solution for calculating a user motion distance by using a trajectory recorded by a GPS module. In this solution, the GPS module has large power consumption, and easily fails in an indoor environment. For example, when a user moves on an indoor treadmill, the GPS module cannot record a trajectory, and therefore a motion distance cannot be calculated. However, the solution provided in the embodiments of this application can reduce power consumption, and are also applicable to an indoor environment.

Figure 9A:
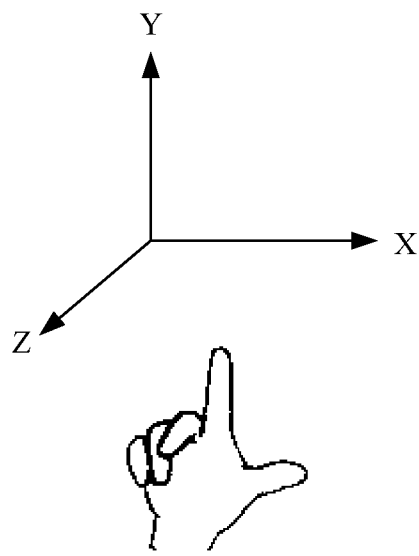
FIG. 9A is a schematic diagram of a right-hand rectangular coordinate system according to an embodiment of this application.

In the embodiments of this application, the sensor coordinate system, the foot coordinate system, and the ground coordinate system each may be a rectangular coordinate system. Each coordinate system may include three coordinate axes that may be represented by an X-axis, a Y-axis, and a Z-axis. Specifically, the sensor coordinate system, the foot coordinate system, and the ground coordinate system each may be a right-hand rectangular coordinate system shown in FIG. 9A or a left-hand rectangular coordinate system shown in FIG. 9B. The following embodiments of this application are described by using an example in which the sensor coordinate system, the foot coordinate system, and the ground coordinate system each are the right-hand rectangular coordinate system shown in FIG. 9A.

Figure 10:
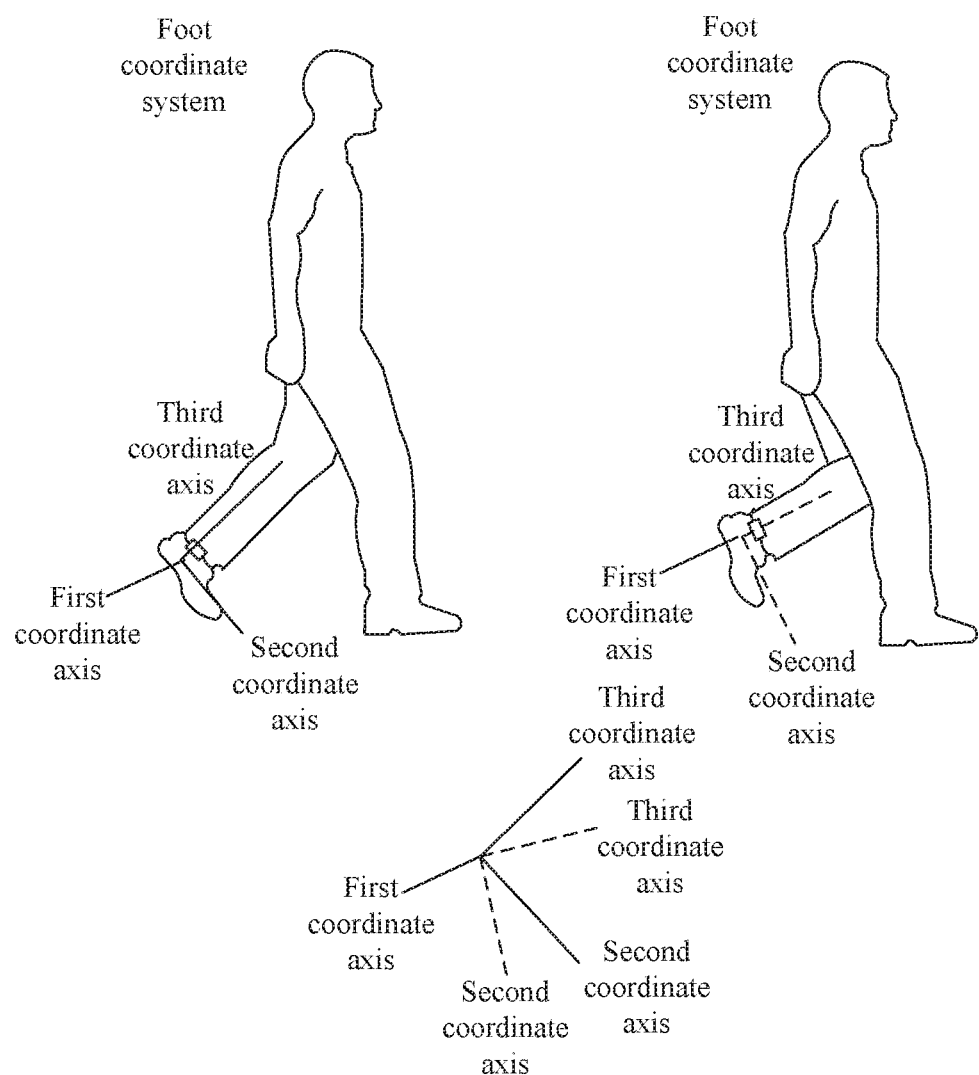
FIG. 10 is a schematic diagram of a foot coordinate system according to an embodiment of this application.
Figure 11A:
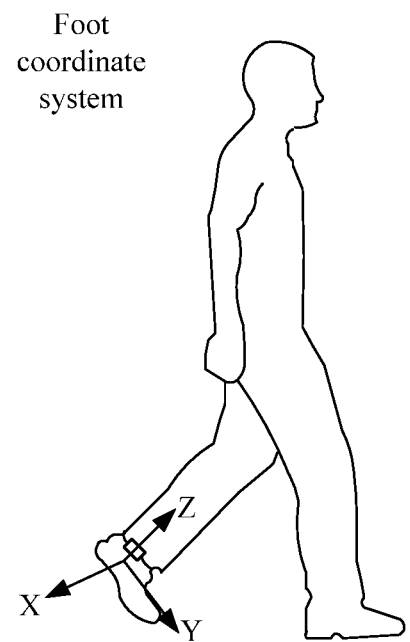
FIG. 11A is a schematic diagram of another foot coordinate system according to an embodiment of this application.
Figure 11B:
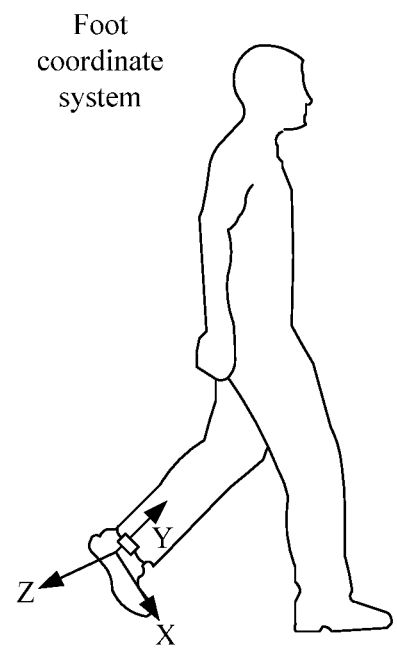
FIG. 11B is a schematic diagram of another foot coordinate system according to an embodiment of this application.
Figure 11C:
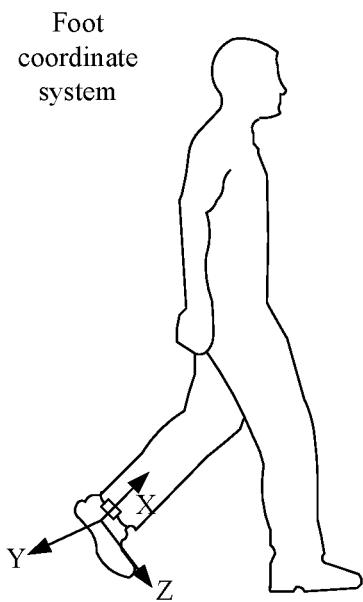
FIG. 11C is a schematic diagram of another foot coordinate system according to an embodiment of this application.
Figure 11D:
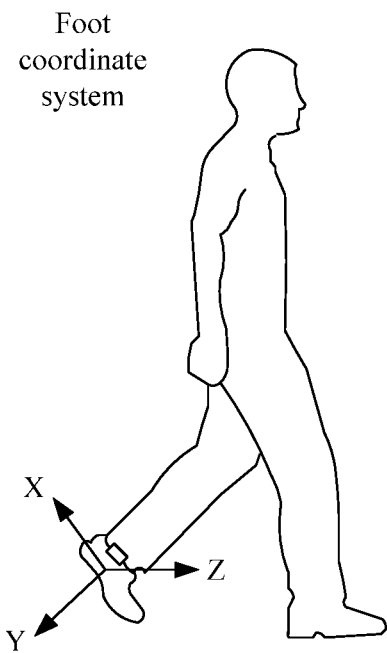
FIG. 11D is a schematic diagram of another foot coordinate system according to an embodiment of this application.
Figure 11E:
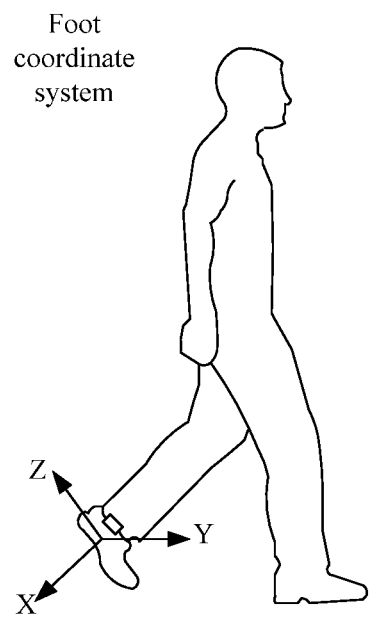
FIG. 11E is a schematic diagram of another foot coordinate system according to an embodiment of this application.
Figure 11F:
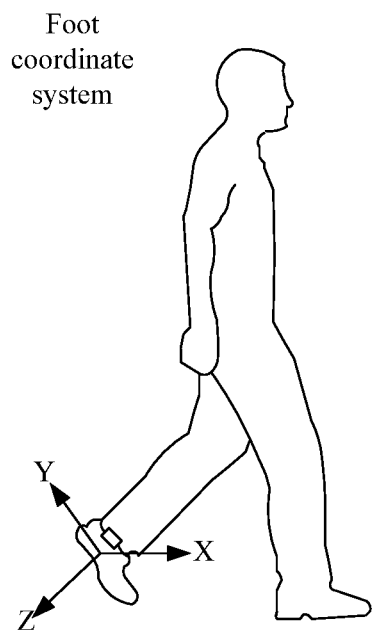
FIG. 11F is a schematic diagram of another foot coordinate system according to an embodiment of this application.

In the embodiments of this application, referring to FIG. 10, a first coordinate axis of the foot coordinate system, a second coordinate axis of the foot coordinate system, and a third coordinate axis of the foot coordinate system are perpendicular to each other, the second coordinate axis of the foot coordinate system is on a plane to which a direction of a heel-to-tiptoe connection line and an extension direction of the shank belong, and the third coordinate axis of the foot coordinate system is parallel to the extension direction of the shank. On the plane to which the direction of the heel-to-tiptoe connection line and the extension direction of the shank belong, a direction perpendicular to the extension direction of the shank is unique, and the direction is a direction of the second coordinate axis of the foot coordinate system. When the user stands still, the direction of the second coordinate axis of the foot coordinate system is parallel to the heel-to-tiptoe direction. In the embodiments of this application, a direction of the third coordinate axis, parallel to the extension direction of the shank, of the foot coordinate system is not specifically limited, and the direction of the second coordinate axis, perpendicular to the third coordinate axis of the foot coordinate system, of the foot coordinate system is not specifically limited.

In addition, it can be learned from FIG. 10 that the second coordinate axis of the foot coordinate system is perpendicular to the third coordinate axis of the foot coordinate system, and the third coordinate axis of the foot coordinate system is parallel to the extension direction of the shank. Therefore, when the user moves, the direction of the second coordinate axis of the foot coordinate system varies with the extension direction of the shank, but the second coordinate axis of the foot coordinate system, the third coordinate axis of the foot coordinate system, and the direction of the heel-to-tiptoe connection line are always on a same plane. The first coordinate axis of the foot coordinate system is perpendicular to a plane to which the second coordinate axis of the foot coordinate system and the third coordinate axis of the foot coordinate system belong. The first coordinate axis of the foot coordinate system is parallel to a direction that passes through the ankle and that is perpendicular to the plane to which the second coordinate axis of the foot coordinate system and the third coordinate axis of the foot coordinate system belong. When the user moves, the foot and the shank rotate along the direction that passes through the ankle and that is perpendicular to the plane to which the second coordinate axis of the foot coordinate system and the third coordinate axis of the foot coordinate system belong, that is, the foot and the shank rotate around the first coordinate axis of the foot coordinate system, and the wearable device rotates around the first coordinate axis of the foot coordinate system along with the wearing position (the foot, the shank, or the ankle).

In the embodiments of this application, a correspondence between the three coordinate axes of the foot coordinate system and an X-axis, a Y-axis, and a Z-axis is not specifically limited. For example, for a schematic diagram of the foot coordinate system, refer to FIG. 11A to FIG. 11F.

Figure 12:
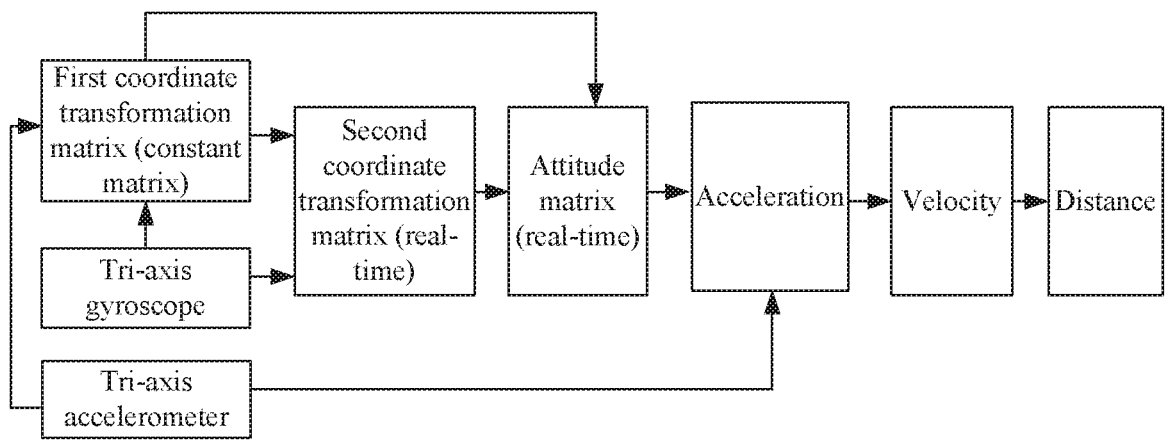
FIG. 12 is a flowchart of another distance calculation method according to an embodiment of this application.

Further, referring to FIG. 12, before step 101, the method provided in the embodiments of this application may further include the following step:

Step 106: The wearable device calculates the first coordinate transformation matrix based on the measured value of the accelerometer and the measured value of the gyroscope.

In the prior art, when calculating a real-time attitude matrix at each sampling moment, a wearable device needs to perform complex convergence on real-time measured values of an accelerometer, a gyroscope, and a magnetometer, for example, matrix inversion or covariance matrix calculation. In the embodiments of this application, although the wearable device also needs to calculate the first coordinate transformation matrix with reference to the measured value of the accelerometer and the measured value of the gyroscope, in a normal case, the wearable device needs to calculate the first coordinate transformation matrix with reference to the measured value of the accelerometer and the measured value of the gyroscope only once, so that a real-time attitude matrix can be calculated at each sampling moment based on the first coordinate transformation matrix, which is a constant matrix, obtained through calculation, and a real-time measured value of the gyroscope. Therefore, compared with the prior art, a calculation amount and calculation complexity can be reduced in the method provided in the embodiments of this application.

It should be noted that the constant matrix herein means that a coordinate transformation matrix between the sensor coordinate system and the foot coordinate system is fixed in a normal case in which the wearable device is not loose. When the wearable device detects that the wearable device is loose, relative locations of the sensor coordinate system and the foot coordinate system change, and the wearable device may re-calculate a first coordinate transformation matrix.

Specifically, step 106 may include the following steps.

Step 1061: When a fluctuation range of the measured value of the accelerometer is greater than or equal to a first preset value, the wearable device calculates a first vector based on the measured value of the gyroscope and according to a principal component analysis method, where the first vector is a vector representation of the first coordinate axis of the foot coordinate system in the sensor coordinate system.

Figure 13:
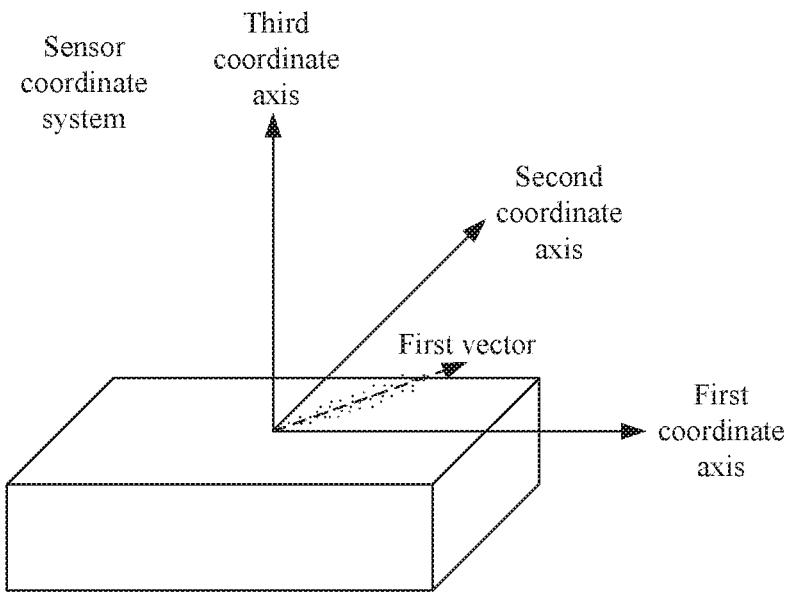
FIG. 13 is a diagram of a relationship between a first vector and a sensor coordinate system according to an embodiment of this application.

When the fluctuation range of the measured value of the accelerometer is greater than or equal to the first preset value, it may indicate that fluctuation of the measured value of the accelerometer is relatively large, and the user is in a moving state. In addition, when the user moves, the wearable device rotates around the first coordinate axis of the foot coordinate system along with the wearing position, the gyroscope in the wearable device also rotates around the first coordinate axis of the foot coordinate system along with the wearing position, the gyroscope detects a rotational angular velocity of the gyroscope, and a vector formed by measured values on three axes of the gyroscope is a rotation axis of the gyroscope. Therefore, the measured values of the gyroscope are distributed near the first coordinate axis of the foot coordinate system. Therefore, referring to FIG. 13, the wearable device may determine a center axis of distribution of a plurality of measured values of the gyroscope according to the principal component analysis method. A unit vector corresponding to the center axis is the first coordinate axis of the foot coordinate system.

In addition, after obtaining the first vector through calculation, the wearable device may further detect, by using the principal component analysis method, whether the first vector changes. If the first vector changes, the wearable device may determine that the wearable device is loose, and therefore may re-calculate a first coordinate transformation matrix based on a changed first vector.

Step 1062: When a fluctuation range of a measured value of the accelerometer in a consecutive time period Q is less than the first preset value, the wearable device calculates a second vector based on the measured value of the accelerometer in the consecutive time period Q, where the second vector is a vector representation of the third coordinate axis of the foot coordinate system in the sensor coordinate system, and the second vector is a unit vector.

When the fluctuation range of the measured value of the accelerometer in the consecutive time period Q is less than the first preset value, it may indicate that a velocity of the sensor is basically unchanged. In this case, it usually may indicate that the user is in a standing still state. When the user stands still, the sensor detects gravity acceleration, no acceleration is available in directions of the second coordinate axis and the first coordinate axis of the foot coordinate system, and the third coordinate axis of the foot coordinate system is parallel to a gravity direction. Therefore, in this case, a unit vector corresponding to the measured value of the accelerometer is the vector representation of the third coordinate axis of the foot coordinate system in the sensor coordinate system. The fluctuation range herein is a difference between a maximum value and a minimum value of measured values of the accelerometer, or a difference between a maximum value and a minimum value of measured values on any coordinate axis of the accelerometer, or a variance of the measured value of the accelerometer in the consecutive time period Q. A value of Q may be specifically set according to an actual requirement. For example, Q may be 1s. This is not specifically limited herein.

Figure 14:
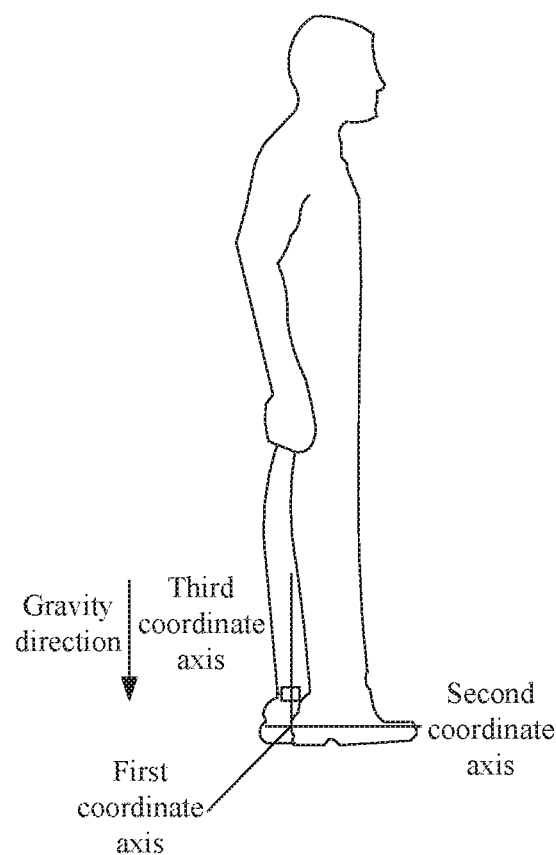
FIG. 14 is a schematic diagram of a user standing still according to an embodiment of this application.

Referring to FIG. 14, when the user stands still, a unit vector corresponding to the measured value of the accelerometer is the second vector. The measured value of the accelerometer includes three components respectively corresponding to three axes. The unit vector corresponding to the measured value of the accelerometer is a unit vector corresponding to the three components of the accelerometer.

In a specific implementation of step 1062, the wearable device may calculate the second vector based on an average value of the measured value of the accelerometer in the consecutive time period Q. To be specific, the wearable device may first calculate an average value corresponding to a measured value on each axis of the accelerometer in the consecutive time period Q, so as to calculate the second vector based on average values respectively corresponding to the three axes.

Alternatively, in another specific implementation of step 1062, the wearable device may calculate the second vector based on any group of measured values of the accelerometer in the consecutive time period Q. The group herein includes measured values that are corresponding to a sampling moment and that are respectively corresponding to the three axes of the accelerometer.

Step 1063: The wearable device calculates a third vector based on the first vector and the second vector, where the third vector is a vector representation of the second coordinate axis of the foot coordinate system in the sensor coordinate system, and the third vector is perpendicular to the first vector and the second vector.

After the first vector, the second vector, and the third vector are obtained, the first vector, the second vector, and the third vector may form the first coordinate transformation matrix.

It should be noted that the first vector, the second vector, and the third vector herein may be a first row vector, a third row vector, and a second row vector of the first coordinate transformation matrix respectively. For example, the first coordinate transformation matrix $R_s^f$ may be expressed as follows:

$$R_s^f = \begin{bmatrix} r_{11} & r_{12} & r_{13} \\ r_{21} & r_{22} & r_{23} \\ r_{31} & r_{32} & r_{33} \end{bmatrix} \quad \text{Expression 2}$$

In the expression 2, the first row vector $(r_{11}, r_{12}, r_{13})$ is the first vector that is the vector representation of the first coordinate axis of the foot coordinate system in the sensor coordinate system; the second row vector $(r_{21}, r_{22}, r_{23})$ is the third vector that is the vector representation of the second coordinate axis of the foot coordinate system in the sensor coordinate system; and the third row vector $(r_{31}, r_{32}, r_{33})$ is the second vector that is the vector representation of the third coordinate axis of the foot coordinate system in the sensor coordinate system.

Figure 15:
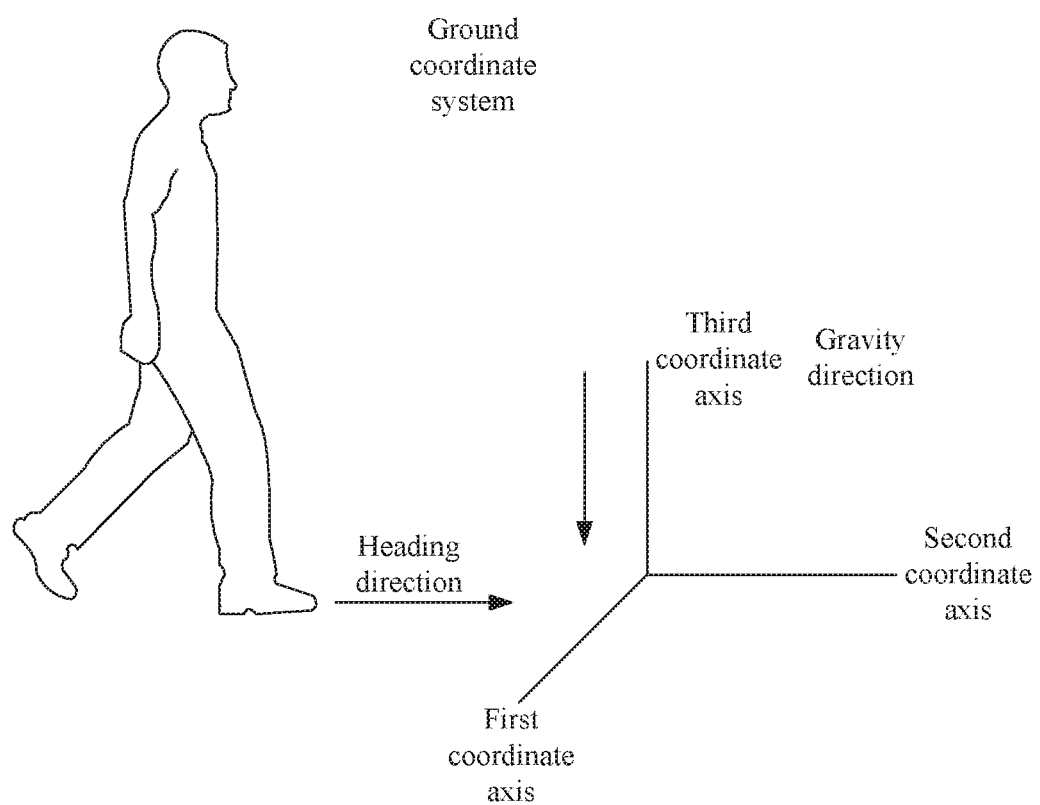
FIG. 15 is a schematic diagram of a ground coordinate system according to an embodiment of this application.
Figure 16A:
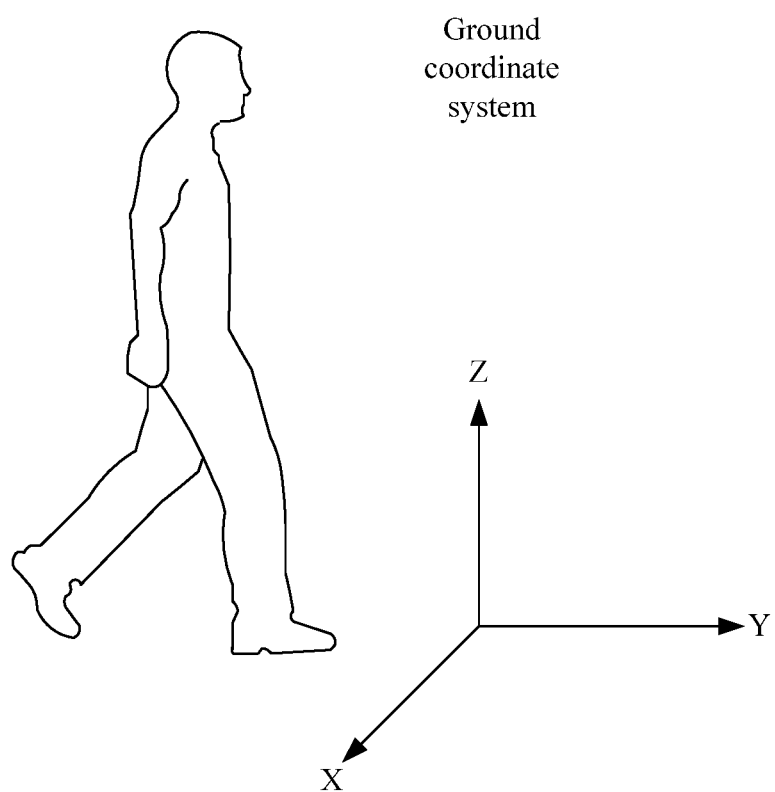
FIG. 16A is a schematic diagram of another ground coordinate system according to an embodiment of this application.
Figure 16B:
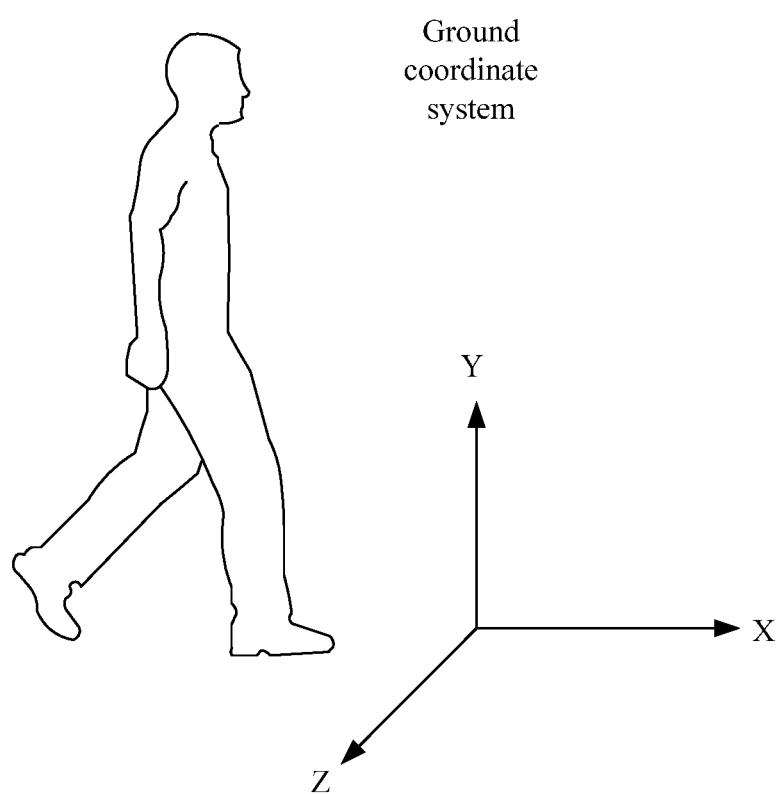
FIG. 16B is a schematic diagram of another ground coordinate system according to an embodiment of this application.
Figure 16C:
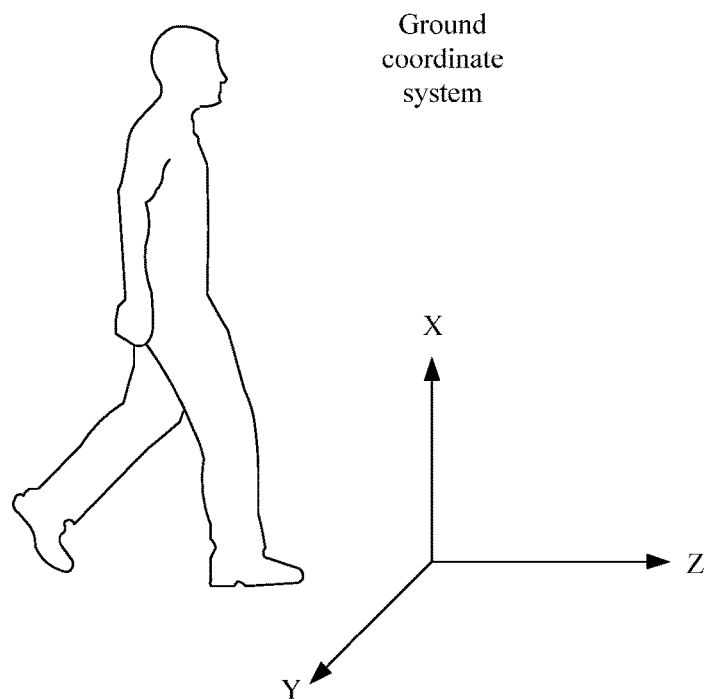
FIG. 16C is a schematic diagram of another ground coordinate system according to an embodiment of this application.
Figure 17:
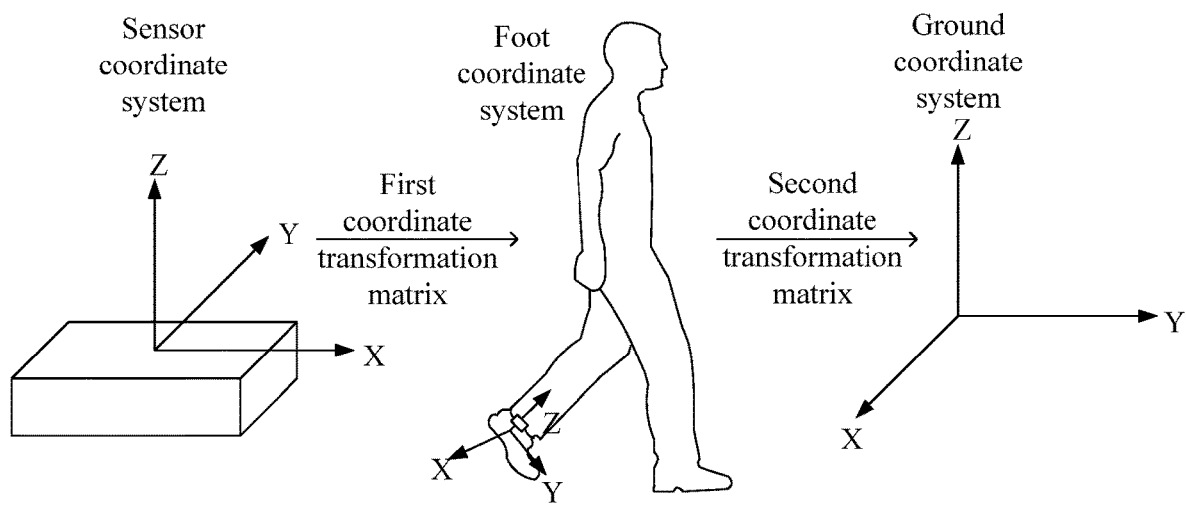
FIG. 17 is a schematic diagram of a coordinate system transformation relationship according to an embodiment of this application.

In the embodiments of this application, referring to FIG. 15, the first coordinate axis of the ground coordinate system, the second coordinate axis of the ground coordinate system, and the third coordinate axis of the ground coordinate system are perpendicular to each other, the second coordinate axis of the ground coordinate system is parallel to a heading direction of the user, and the third coordinate axis of the ground coordinate system is parallel to the gravity direction. When the user moves, the foot rotates around the first coordinate axis of the ground coordinate system. In addition, in the embodiments of this application, a correspondence between the three coordinate axes of the ground coordinate system and an X-axis, a Y-axis, and a Z-axis is not specifically limited. For example, for a definition of the ground coordinate system, refer to FIG. 16A to FIG. 16C. For example, for a transformation relationship between the sensor coordinate system, the foot coordinate system, and the ground coordinate system, refer to FIG. 17.

Figure 18:
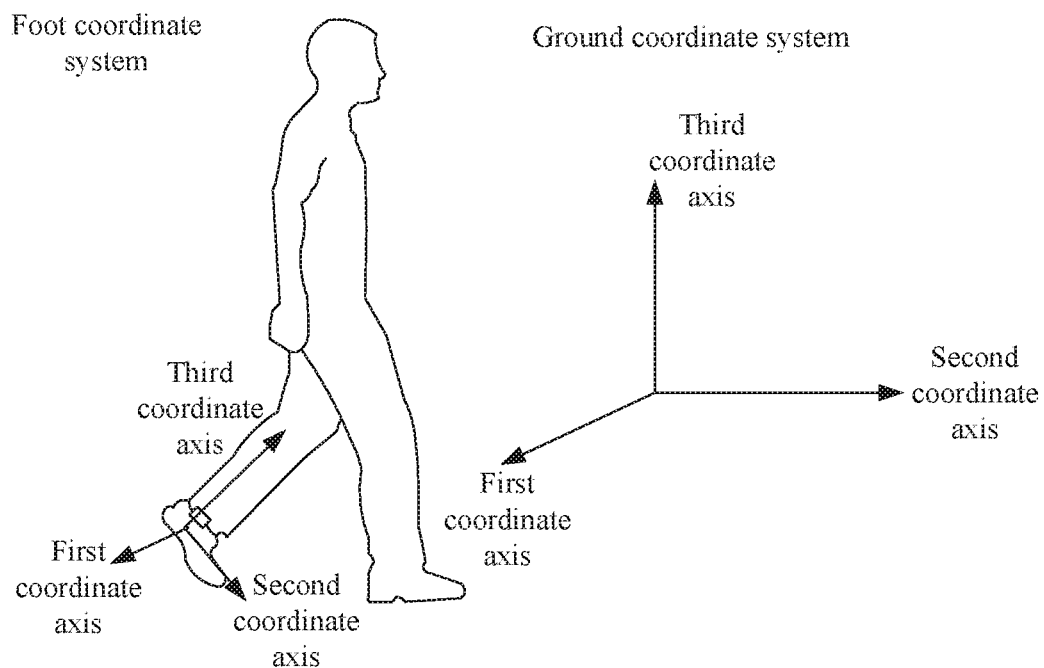
FIG. 18 is a diagram of a correspondence between a foot coordinate system and a ground coordinate system according to an embodiment of this application.

In a specific implementation, the first coordinate axis of the ground coordinate system and the first coordinate axis of the foot coordinate system are in a same direction, the direction of the second coordinate axis of the ground coordinate system is the heading direction of the user, and the direction of the second coordinate axis of the foot coordinate system is the heel-to-tiptoe direction. In this way, the first coordinate axis of the ground coordinate system and the first coordinate axis of the foot coordinate system are in the same direction, and when feet of the user are completely on ground (for example, the user is still), the heel-to-tiptoe direction is consistent with the heading direction of the user, that is, the second coordinate axis of the foot coordinate system and the second coordinate axis of the ground coordinate system are in a same direction. In addition, when the feet of the user are completely on the ground, both the third coordinate axis of the ground coordinate system and the third coordinate axis of the foot coordinate system are parallel to the gravity direction and are in a same direction. This can facilitate calculation of the coordinate transformation matrix from the foot coordinate system to the ground coordinate system. For example, for a correspondence between the foot coordinate system and the ground coordinate system, refer to FIG. 18.

In the embodiments of this application, step 102 may include the following steps.

Step 1021: The wearable device multiplies the first coordinate transformation matrix by the measured value of the gyroscope that is corresponding to the $i^{th}$ sampling moment, to obtain an angular velocity that is corresponding to the $i^{th}$ sampling moment and that is of the sensor in the foot coordinate system.

A measured value of the gyroscope is used to represent an angular velocity of the sensor in the sensor coordinate system. In this step, the angular velocity that is corresponding to the $i^{th}$ sampling moment and that is of the sensor in the foot coordinate system may be expressed as follows:

$$\begin{bmatrix} w_{f,i}^1 \\ w_{f,i}^2 \\ w_{f,i}^3 \end{bmatrix} = R_s^f \begin{bmatrix} w_{s,i}^1 \\ w_{s,i}^2 \\ w_{s,i}^3 \end{bmatrix} \quad \text{Expression 3}$$

In the expression 3, $R_s^f$ indicates the first coordinate transformation matrix, $$\begin{bmatrix} w_{s,i}^1 \\ w_{s,i}^2 \\ w_{s,i}^3 \end{bmatrix}$$

indicates the measured value of the gyroscope that is corresponding to the $i^{th}$ sampling moment, $w_{s,i}^1$ indicates a measured value of the gyroscope that is corresponding to the $i^{th}$ sampling moment and that is on the first coordinate axis of the sensor coordinate system, $w_{s,i}^2$ indicates a measured value of the gyroscope that is corresponding to the $i^{th}$ sampling moment and that is on the second coordinate axis of the sensor coordinate system, $w_{s,i}^3$ indicates a measured value of the gyroscope that is corresponding to the $i^{th}$ sampling moment and that is on the third coordinate axis of the sensor coordinate system, $$\begin{bmatrix} w_{f,i}^1 \\ w_{f,i}^2 \\ w_{f,i}^3 \end{bmatrix}$$

indicates the angular velocity that is corresponding to the $i^{th}$ sampling moment and that is of the sensor in the foot coordinate system, $w_{f,i}^1$ indicates an angular velocity at which the sensor rotates around the first coordinate axis of the foot coordinate system at the $i^{th}$ sampling moment, $w_{f,i}^2$ indicates an angular velocity at which the sensor rotates around the second coordinate axis of the foot coordinate system at the $i^{th}$ sampling moment, and $w_{f,i}^3$ indicates an angular velocity at which the sensor rotates around the third coordinate axis of the foot coordinate system at the $i^{th}$ sampling moment.

Step 1022: The wearable device calculates, based on the angular velocity that is corresponding to the $i^{th}$ sampling moment and that is of the sensor in the foot coordinate system, the second coordinate transformation matrix corresponding to the $i^{th}$ sampling moment.

A coordinate transformation matrix of the foot coordinate system relative to the ground coordinate system satisfies the following expression 4:

$$R'^g_{f,i} = R^g_{f,i} \begin{bmatrix} 0 & -w_{f,i}^3 & w_{f,i}^2 \\ w_{f,i}^3 & 0 & -w_{f,i}^1 \\ -w_{f,i}^2 & w_{f,i}^1 & 0 \end{bmatrix} \quad \text{Expression 4}$$

where $R_{f,i}^g$ indicates the second coordinate transformation matrix corresponding to the $i^{th}$ sampling moment, and $R'^g_{f,i}$ means performing derivation on the second coordinate transformation matrix corresponding to the $i^{th}$ sampling moment relative to time.

Based on the expression 4, the wearable device may calculate a coordinate transformation matrix of the foot coordinate system relative to the ground coordinate system at the $i^{th}$ sampling moment. Therefore, step 1022 may include the following step:

Step 10220: The wearable device calculates, based on the angular velocity that is corresponding to the $i^{th}$ sampling moment and that is of the sensor in the foot coordinate system, a sampling interval of the sensor, and an expression 2 or an expression 3, the second coordinate transformation matrix corresponding to the sampling moment.

The expression 2 is as follows:

$$R^g_{f,i} = R^g_{f,i-1} \exp\left( \begin{bmatrix} 0 & -w_{f,i}^3 & w_{f,i}^2 \\ w_{f,i}^3 & 0 & -w_{f,i}^1 \\ -w_{f,i}^2 & w_{f,i}^1 & 0 \end{bmatrix} \cdot T_0 \right) \quad \text{Expression 2}$$

The expression 3 is as follows:

$$R^g_{f,i} = R^g_{f,i-1} \begin{bmatrix} 1 & 0 & 0 \\ 0 & \cos(T_0 \cdot w_{f,i}^1) & -\sin(T_0 \cdot w_{f,i}^1) \\ 0 & \sin(T_0 \cdot w_{f,i}^1) & \cos(T_0 \cdot w_{f,i}^1) \end{bmatrix} \quad \text{Expression 3}$$

where $R_{f,i}^g$ indicates the second coordinate transformation matrix corresponding to the $i^{th}$ sampling moment, $R_{f,i-1}^g$ indicates a second coordinate transformation matrix corresponding to the $(i-1)^{th}$ sampling moment, exp( ) indicates an exponential function using a natural constant e as a base, and $T_0$ indicates the sampling interval of the sensor.

It can be learned from the expression 2 or the expression 3 that the wearable device may calculate the second coordinate transformation matrix corresponding to the $i^{th}$ sampling moment, based on the second coordinate transformation matrix corresponding to the $(i-1)^{th}$ sampling moment, and the measured value of the gyroscope that is corresponding to the $i^{th}$ sampling moment. In other words, calculation of a second coordinate transformation matrix corresponding to a current sampling moment is related to a second coordinate transformation matrix corresponding to a previous sampling moment of the current sampling moment.

In a moving process of the user, the foot mainly rotates around the first coordinate axis of the foot coordinate system, and rotational angular velocities at which the foot rotates around the second coordinate axis and the third coordinate axis of the foot coordinate system may be ignored, that is, $w_{f,i}^2 \approx 0$ and $w_{f,i}^3 \approx 0$. Therefore, the expression 2 may be simplified into the expression 3. Compared with the expression 2, the simplified expression 3 can be used to reduce calculation complexity.

In addition, when the simplified expression 3 is used, if the first coordinate axis of the ground coordinate system and the first coordinate axis of the foot coordinate system are kept consistent at an initial moment when the user moves, even if the user makes a turn, the first coordinate axis of the ground coordinate system and the first coordinate axis of the foot coordinate system can be always kept consistent, thereby ensuring that the second coordinate axis of the ground coordinate system is always the heading direction of the user.

Specifically, it is assumed that the first coordinate axis of the ground coordinate system and the first coordinate axis of the foot coordinate system are kept consistent at the initial moment when the user moves. Referring to the following expression 5, the $1^{st}$ row and the $1^{st}$ column of a second coordinate transformation matrix $R_f^g(0)$ corresponding to the initial moment when the user moves are unit vectors:

$$R_f^g(0) = \begin{bmatrix} 1 & 0 & 0 \\ 0 & r_{f,22}^g & r_{f,23}^g \\ 0 & r_{f,32}^g & r_{f,33}^g \end{bmatrix} \quad \text{Expression 5}$$

When the simplified expression 3 is used, because the $1^{st}$ row and the $1^{st}$ column of $$\begin{bmatrix} 1 & 0 & 0 \\ 0 & \cos(T_0 \cdot w_{f,i}^1) & -\sin(T_0 \cdot w_{f,i}^1) \\ 0 & \sin(T_0 \cdot w_{f,i}^1) & \cos(T_0 \cdot w_{f,i}^1) \end{bmatrix}$$

in the expression 3 are unit vectors, at the $1^{st}$ sampling moment, the $1^{st}$ row and the $1^{st}$ column of a second coordinate system are also unit vectors. By analogy, the $1^{st}$ row and the $1^{st}$ column of a second coordinate system transformation matrix corresponding to each sampling moment are unit vectors, that is, the first coordinate axis of the ground coordinate system and the first coordinate axis of the foot coordinate system are always kept consistent, thereby ensuring that the second coordinate axis of the ground coordinate system is always the heading direction of the user.

Figure 19:
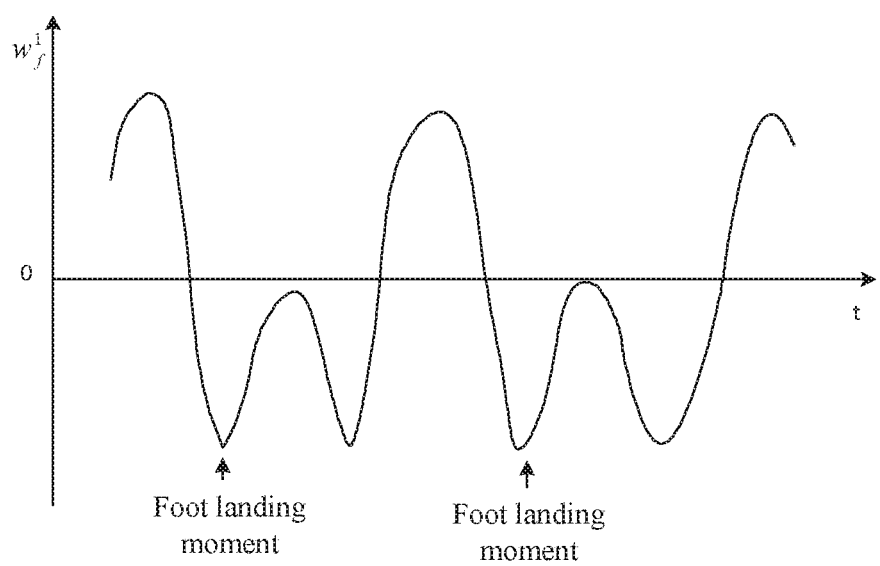
FIG. 19 is a schematic diagram of a foot landing moment according to an embodiment of this application.

In addition, the method provided in the embodiments of this application is further related to a foot landing moment and a correction moment. The foot landing moment is a moment at which the foot of the user gets in contact with the ground. At the moment when the foot gets in contact with the ground, the ground generates relatively large impact on the sensor, causing a transient increase in a measurement result of the accelerometer. The wearable device may determine the foot landing moment based on this characteristic. Specifically, the wearable device may determine the foot landing moment in a plurality of manners. For example, in a manner, the foot landing moment may be a moment corresponding to a maximum value of magnitude of a vector represented by a measured value of the accelerometer. In another manner, the foot landing moment may be alternatively determined based on a projection $w_f^1$ of a measured value of the gyroscope on the first coordinate axis of the foot coordinate system, namely, an angular velocity at which the sensor rotates around the first coordinate axis of the foot coordinate system. Referring to FIG. 19, a moment corresponding to the $1^{st}$ local minimum value after $w_f^1$ changes from a positive value to a negative value may be a foot landing moment.

That $w_f^1$ changes from a positive value to a negative value means that the foot starts to fall. When the foot lands on the ground, because the foot is in contact with the ground, a rotational velocity of the foot decreases, causing a local minimum value of $w_f^1$. The following embodiments of this application are described by using an example in which the foot landing moment is the moment corresponding to the maximum value of the magnitude of the vector represented by the measured value of the accelerometer. The correction moment is a moment that is corresponding to a minimum value of a velocity of the sensor on the second coordinate axis of the ground coordinate system and that is in preset duration including the foot landing moment. It should be noted that both the foot landing moment and the correction moment in the embodiments of this application are sampling moments. The preset duration herein may also be referred to as a preset interval, a preset time period, or the like.

Figure 23:
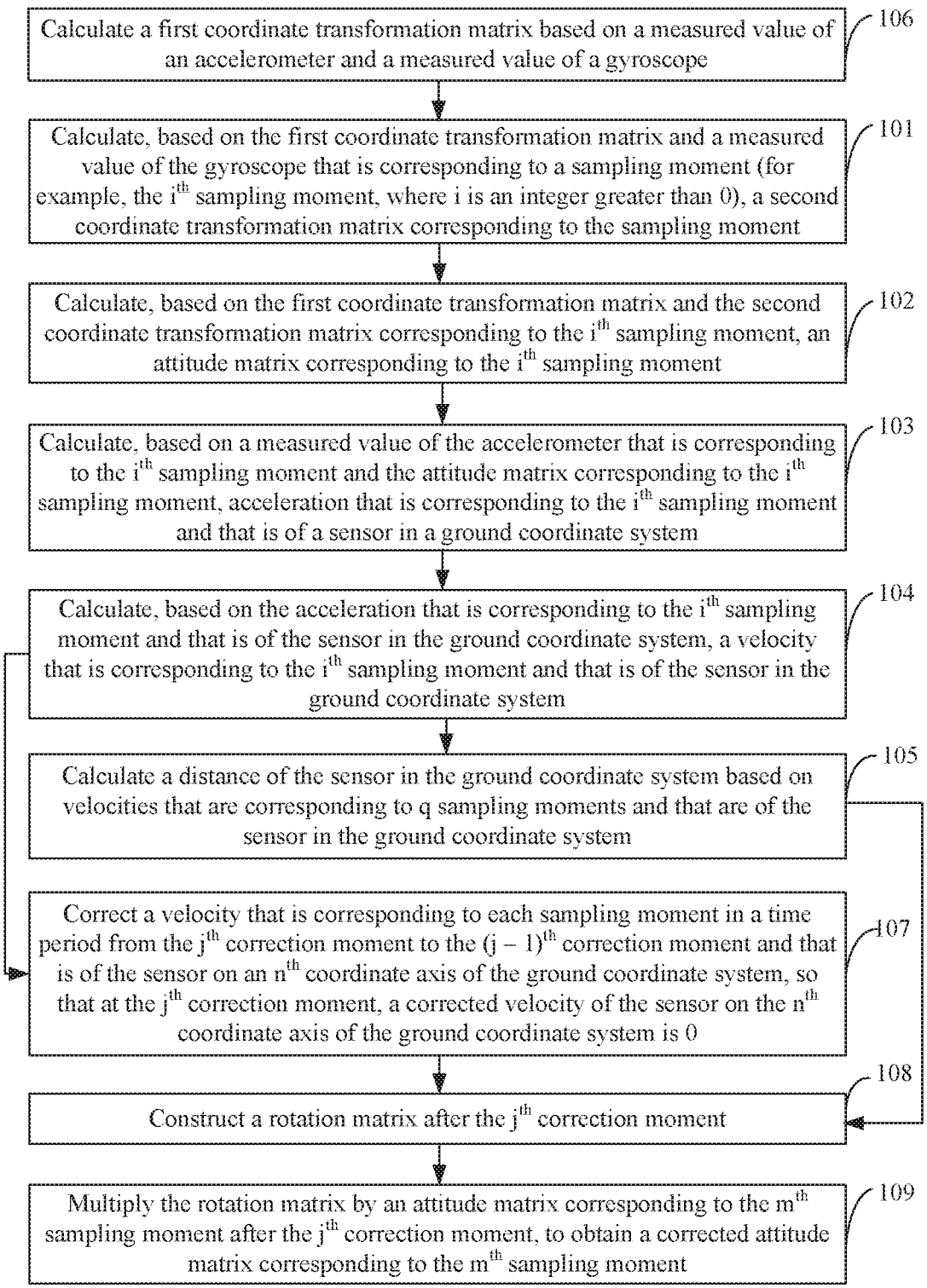
FIG. 23 is a flowchart of another distance calculation method according to an embodiment of this application.

Further, after each correction moment (for example, the $j^{th}$ correction moment, where j is an integer greater than 0), referring to FIG. 23, the method may further include the following step:

Step 107: Correct a velocity that is corresponding to each sampling moment in a time period from the $j^{th}$ correction moment to the $(j-1)^{th}$ correction moment and that is of the sensor on an $n^{th}$ coordinate axis of the ground coordinate system, so that at the $j^{th}$ correction moment, a corrected velocity of the sensor on the $n^{th}$ coordinate axis of the ground coordinate system is 0, where a value of n is 1, 2, or 3.

The $n^{th}$ coordinate axis may be the first coordinate axis of the ground coordinate system, the second coordinate axis of the ground coordinate system, or the third coordinate axis of the ground coordinate system. That is, the wearable device may correct a velocity on the first coordinate axis of the ground coordinate system, a velocity on the second coordinate axis of the ground coordinate system, or a velocity on the third coordinate axis of the ground coordinate system.

In a moving process of the user, the foot periodically lands on the ground. Correspondingly, an advance velocity of the sensor periodically increases or decreases, and a velocity of the foot approaches 0 at a foot landing moment. In addition, at a moment when the foot gets in contact with the ground, the ground generates relatively large impact on the sensor, causing a transient increase in a measured value of the accelerometer. The wearable device may determine the foot landing moment based on this characteristic.

Specifically, the wearable device may first determine a moment corresponding to a maximum value of magnitude of a vector represented by a measured value of the accelerometer, where the moment is a foot landing moment. Then the wearable device may determine preset duration including the foot landing moment. For example, the preset duration may be ⅓ of duration of a running period. Further, in the preset duration, the wearable device may search for a moment corresponding to a minimum value of a velocity of the sensor on the second coordinate axis of the ground coordinate system. The moment is a correction moment corresponding to the foot landing moment. That is, at the correction moment, if there is no cumulative error, the velocity of the sensor on the second coordinate axis of the ground coordinate system should be 0 theoretically. In addition, velocities of the sensor on the first coordinate axis and the third coordinate axis of the ground coordinate system should also be 0 theoretically. That is, a velocity of the sensor in the ground coordinate system should be 0 theoretically. In addition, when the user moves, the foot rotates around the first coordinate axis of the ground coordinate system. Therefore, a velocity of the sensor on the first coordinate axis of the ground coordinate system is basically 0.

Figure 20:
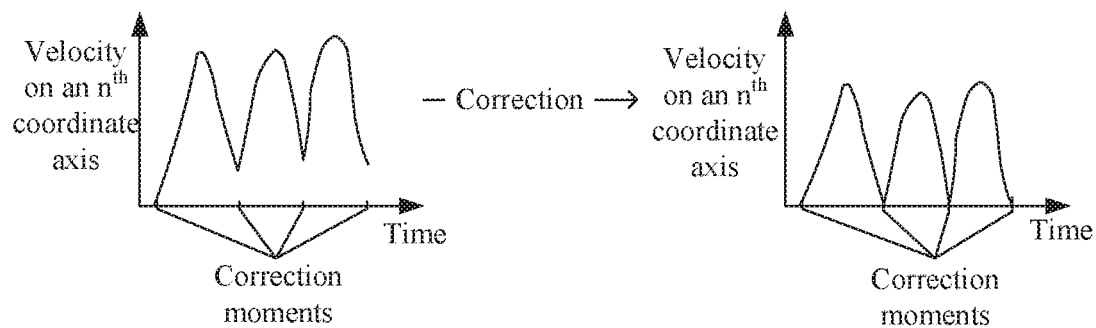
FIG. 20 is a schematic diagram of velocity correction according to an embodiment of this application.

Therefore, referring to FIG. 20, after correction moments are determined, the wearable device may correct, in a time period between two adjacent correction moments, at least one of a velocity that is corresponding to each sampling moment and that is of the sensor on the first coordinate axis of the ground coordinate system, a velocity that is corresponding to each sampling moment and that is of the sensor on the second coordinate axis of the ground coordinate system, or a velocity that is corresponding to each sampling moment and that is of the sensor on the third coordinate axis of the ground coordinate system, so that at a correction moment, at least one of a corrected velocity of the sensor on the first coordinate axis of the ground coordinate system, a corrected velocity of the sensor on the second coordinate axis of the ground coordinate system, or a corrected velocity of the sensor on the third coordinate axis of the ground coordinate system is 0. This can reduce a cumulative error in a calculation process and improve calculation accuracy.

It should be noted that after each correction moment, when n has a plurality of values, step 107 may be correspondingly performed for a plurality of times. For example, in a specific implementation, the wearable device may correct the velocity on the second coordinate axis of the ground coordinate system and the velocity on the first coordinate axis of the ground coordinate system. Specifically, when n is 2, the wearable device may perform step 107 once, to correct the velocity on the second coordinate axis of the ground coordinate system; and when n is 1, the wearable device may perform step 107 once again, to correct the velocity on the first coordinate axis of the ground coordinate system.

Specifically, step 107 may include the following step:

Step 1070: The wearable device separately corrects, based on an expression 4, a velocity that is corresponding to each sampling moment (for example, the $i^{th}$ sampling moment) in the time period from the $j^{th}$ correction moment to the $(j-1)^{th}$ correction moment and that is of the sensor on the $n^{th}$ coordinate axis of the ground coordinate system.

The expression 4 is as follows:

$$\overline{v}_g^k(t_j) = v_g^k(t_j) - (t_j - t^{j-1}) \frac{v_g^k(t^j) - v_g^k(t^{j-1})}{t^j - t^{j-1}} - v_g^k(t^{j-1}), \quad \text{Expression 4}$$

$$t \in [t^{j-1}, t^j]$$

where $t^j$ indicates the $j^{th}$ correction moment, $t^{j-1}$ indicates the $(j-1)^{th}$ correction moment, $v_g^k(t_i)$ indicates a velocity that is corresponding to the sampling moment and that is $i^{th}$ of the sensor on the $n^{th}$ coordinate axis of the ground coordinate system, $\overline{v}_g^k(t_i)$ indicates a corrected velocity that is corresponding to the $i^{th}$ sampling moment and that is of the sensor on the $n^{th}$ coordinate axis of the ground coordinate system, $v_g^k(t^j)$ indicates a velocity that is corresponding to the $j^{th}$ correction moment and that is of the sensor on the $n^{th}$ coordinate axis of the ground coordinate system, and $v_g^k(t^{j-1})$ indicates a velocity that is corresponding to the $(j-1)^{th}$ correction moment and that is of the sensor on the $n^{th}$ coordinate axis of the ground coordinate system.

It can be learned from the expression 4 that the wearable device may correct, by using a linear compensation method, the velocity that is corresponding to each sampling moment in the time period from the $j^{th}$ correction moment to the $(j-1)^{th}$ correction moment and that is of the sensor on the $n^{th}$ coordinate axis of the ground coordinate system, so that at the $j^{th}$ correction moment, a corrected velocity of the sensor on the $n^{th}$ coordinate axis of the ground coordinate system is 0.

After the correction moment in step 107, that the wearable device calculates a distance of the sensor in the ground coordinate system based on velocities that are corresponding to q sampling moments and that are of the sensor in the ground coordinate system in step 105 may include the following steps:

Step 1051: The wearable device calculates, based on a corrected velocity that is corresponding to each sampling moment in the time period from the $j^{th}$ correction moment to the $(j-1)^{th}$ correction moment and that is of the sensor on the $n^{th}$ coordinate axis of the ground coordinate system, a distance of the sensor on the $n^{th}$ coordinate axis of the ground coordinate system in the time period from the $j^{th}$ correction moment to the $(j-1)^{th}$ correction moment.

Step 1052: The wearable device calculates a total distance that is corresponding to the $j^{th}$ correction moment and that is of the sensor in the ground coordinate system, based on the distance of the sensor on the $n^{th}$ coordinate axis of the ground coordinate system in the time period from the $j^{th}$ correction moment to the $(j-1)^{th}$ correction moment, and a total distance that is corresponding to the $(j-1)^{th}$ correction moment and that is of the sensor in the ground coordinate system.

Specifically, referring to FIG. 20, the wearable device performs integration on velocities of the sensor on the $n^{th}$ coordinate axis of the ground coordinate system in the time period from the $j^{th}$ correction moment to the $(j-1)^{th}$ correction moment, to obtain the corresponding distance of the sensor on the $n^{th}$ coordinate axis of the ground coordinate system in the time period from the $j^{th}$ correction moment to the $(j-1)^{th}$ correction moment. When n is 1, 2, or 3, the wearable device may obtain a corresponding distance of the sensor on each of the three coordinate axes of the ground coordinate system in the time period from the $j^{th}$ correction moment to the $(j-1)^{th}$ correction moment. Then the wearable device may perform square root calculation on a quadratic sum of distances on the three coordinate axes, to obtain a motion distance in the time period from the $j^{th}$ correction moment to the $(j-1)^{th}$ correction moment, and may add the motion distance to the total distance that is corresponding to the $(j-1)^{th}$ correction moment and that is of the sensor in the ground coordinate system, to obtain the total distance that is corresponding to the $j^{th}$ correction moment and that is of the sensor in the ground coordinate system.

Figure 21:
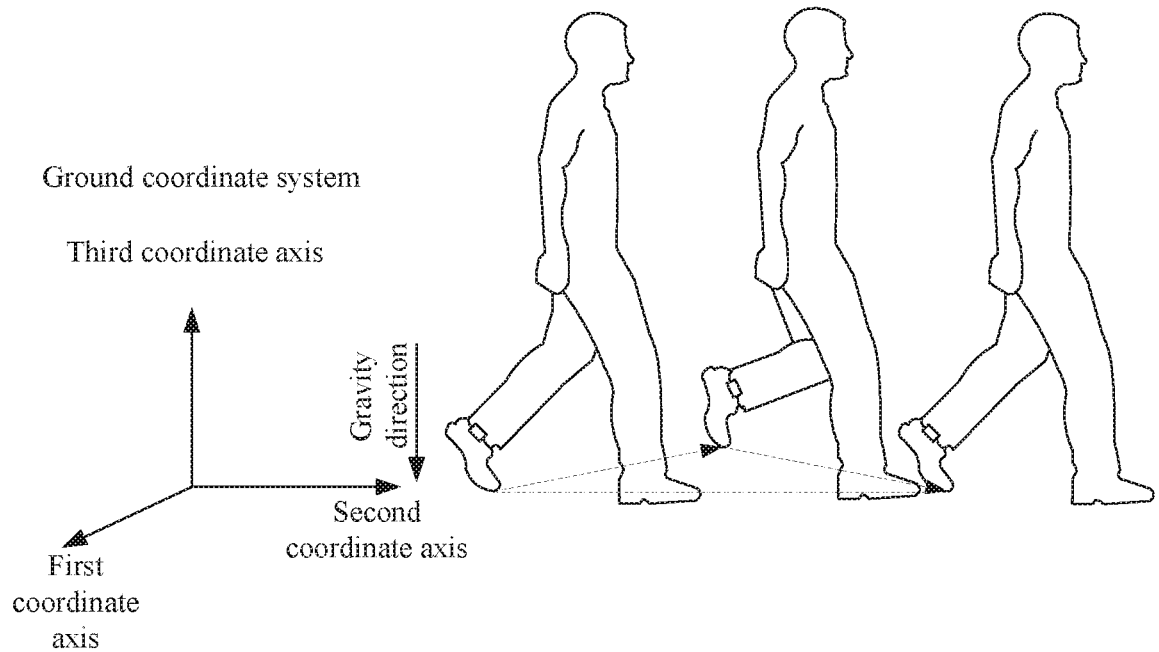
FIG. 21 is a schematic diagram of a distance in a gravity direction according to an embodiment of this application.

In addition, in a moving process of the user, if an attitude matrix is correctly calculated, referring to FIG. 21, in a time period between two adjacent correction moments, a distance of the sensor on the third coordinate axis (that is, a coordinate axis parallel to the gravity direction) of the ground coordinate system should be 0. In addition, in the time period between the two adjacent correction moments, a velocity of the sensor on the second coordinate axis of the ground coordinate system has no cumulative error, that is, a velocity that is corresponding to a correction moment and that is of the sensor on the second coordinate axis (that is, a coordinate axis parallel to the heading direction of the user) of the ground coordinate system should be 0.

Figure 22:
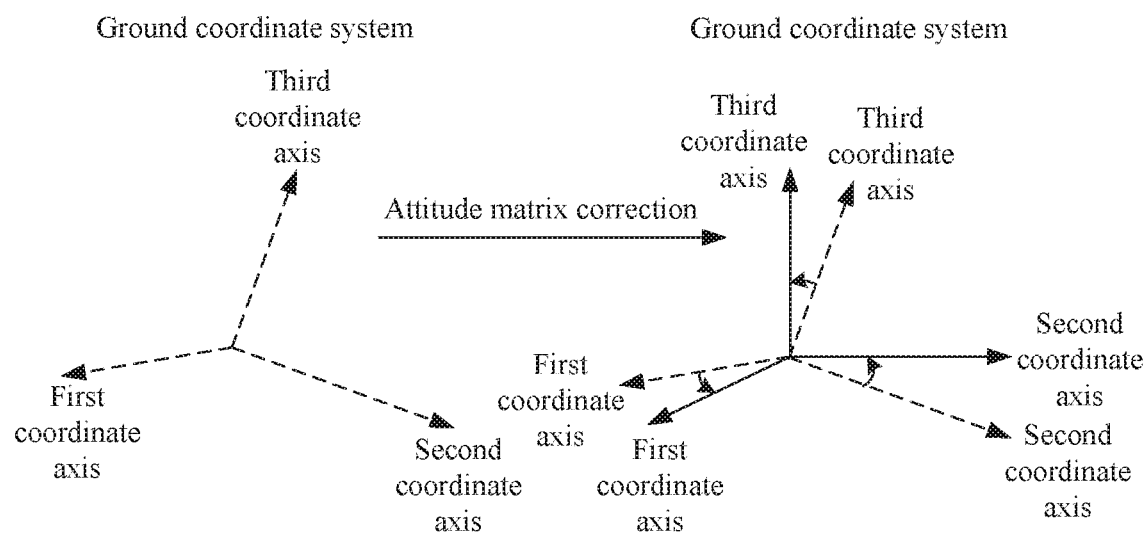
FIG. 22 is a schematic diagram of attitude matrix correction according to an embodiment of this application.

In a time period between two adjacent correction moments, when a distance of the sensor on the third coordinate axis (that is, the coordinate axis parallel to the gravity direction) of the ground coordinate system is not 0, or when a velocity that is corresponding to a correction moment and that is of the sensor on the second coordinate axis (that is, the coordinate axis parallel to the heading direction of the user) of the ground coordinate system is not 0, it may indicate that an attitude matrix is incorrectly calculated, so that there is a deviation between a defined ground coordinate matrix and a ground coordinate system that is actually obtained based on a sensor coordinate system and a coordinate transformation matrix represented by the attitude matrix. Therefore, referring to FIG. 22, the wearable device may rotate the attitude matrix by multiplying the attitude matrix by a rotation matrix, to adjust the actually obtained ground coordinate system (a ground coordinate system marked by dashed lines in FIG. 22) by adjusting the attitude matrix, so as to reduce the deviation between the actually obtained ground coordinate system and the defined ground coordinate system (a ground coordinate system marked by solid lines in FIG. 22) as much as possible and reduce the distance of the sensor on the third coordinate axis (that is, the coordinate axis parallel to the gravity direction) of the ground coordinate system in the time period between the two adjacent correction moments, so that the distance of the sensor on the third coordinate axis (that is, the coordinate axis parallel to the gravity direction) of the ground coordinate system in the time period between the two adjacent correction moments approaches 0 as much as possible; or reduce the velocity that is corresponding to the correction moment and that is of the sensor on the second coordinate axis (that is, the coordinate axis parallel to the heading direction of the user) of the ground coordinate system, so that the velocity that is corresponding to the correction moment and that is of the sensor on the second coordinate axis (that is, the coordinate axis parallel to the heading direction of the user) of the ground coordinate system approaches 0 as much as possible.

Therefore, after the $j^{th}$ correction moment, referring to FIG. 23, the method may further include the following steps.

Step 108: The wearable device constructs a rotation matrix.

Specifically, the rotation matrix C may be expressed as an expression 5:

$$C = \begin{bmatrix} 1 & 0 & 0 \\ 0 & \cos\theta & \sin\theta \\ 0 & -\sin\theta & \cos\theta \end{bmatrix} \quad \text{Expression 5}$$

In the expression 5, $\theta$ indicates a rotation angle.

Step 109. The wearable device multiplies the rotation matrix by an attitude matrix corresponding to the $m^{th}$ sampling moment after the $j^{th}$ correction moment, to obtain a corrected attitude matrix corresponding to the $m^{th}$ sampling moment, where m is an integer greater than 0.

For a correspondence between the rotation matrix and the attitude matrix corresponding to the $m^{th}$ sampling moment before and after correction, refer to the following expression 6:

$$\overline{R}_{s,m}{}^g = C \cdot R_{s,m}{}^g \quad \text{Expression 6}$$

where $R_{s,m}{}^g$ indicates the attitude matrix corresponding to the $m^{th}$ sampling moment before correction, and $\overline{R}_{s,m}{}^g$ indicates the attitude matrix corresponding to the $m^{th}$ sampling moment after correction.

The $m^{th}$ sampling moment herein may be a sampling moment that is after the $j^{th}$ correction moment (a moment that is corresponding to a minimum value of a velocity of the sensor on the second coordinate axis of the ground coordinate system) and that is determined by the wearable device, and may be specifically a sampling moment in a relatively small time range after the $j^{th}$ correction moment, for example, may be the $1^{st}$ sampling moment after the $j^{th}$ correction moment. In this way, the wearable device may correct the attitude matrix around the $j^{th}$ correction moment.

In addition, it can be learned from the expression 1 that an attitude matrix is a product of the first coordinate transformation matrix and a second coordinate transformation matrix, and the first coordinate transformation matrix is a constant matrix. Therefore, correcting the attitude matrix is actually equivalent to correcting the second coordinate transformation matrix. In addition, it can be learned from the expression 2 and the expression 3 that calculation of a second coordinate transformation matrix corresponding to each sampling moment is related to a second coordinate transformation matrix corresponding to a previous sampling moment of the sampling moment. Therefore, calculation of an attitude matrix corresponding to each sampling moment is also related to an attitude matrix corresponding to the previous sampling moment of the sampling moment.

Therefore, after the corrected attitude matrix corresponding to the $m^{th}$ sampling moment is obtained, starting from the $(m+1)^{th}$ sampling moment, the wearable device may calculate, based on the corrected attitude matrix corresponding to the $m^{th}$ sampling moment, an attitude matrix corresponding to each sampling moment, until a new corrected attitude matrix is obtained after the $(j+1)^{th}$ correction moment.

For example, when the $m^{th}$ moment is the $1^{st}$ sampling moment after the $j^{th}$ correction moment, the wearable device may obtain a corrected attitude matrix corresponding to the $1^{st}$ sampling moment after the $j^{th}$ correction moment. Starting from the $2^{nd}$ sampling moment after the $j^{th}$ correction moment, the wearable device may calculate, based on the corrected attitude matrix corresponding to the $1^{st}$ sampling moment after the $j^{th}$ correction moment, an attitude matrix corresponding to each sampling moment, so as to calculate acceleration and a velocity that are corresponding to each sampling moment, until a corrected attitude matrix corresponding to the $1^{st}$ sampling moment after the $(j+1)^{th}$ correction moment is obtained.

In the embodiments of this application, step 108 may specifically include the following steps:

Step 1081: The wearable device calculates a rotation angle in the rotation matrix based on at least one of distances of the sensor on the second coordinate axis and the third coordinate axis of the ground coordinate system in the time period from the $j^{th}$ correction moment to the $(j-1)^{th}$ correction moment, or a velocity of the sensor on the second coordinate axis of the ground coordinate system at the $j^{th}$ correction moment.

Step 1082: The wearable device constructs the rotation matrix based on the rotation angle and the expression 5.

The rotation angle $\theta$ is a first rotation angle $\theta_1$ in an expression 6, a second rotation angle $\theta_2$ in an expression 7, or a third rotation angle $\theta_3$ in an expression 8:

$$\theta_1 = \arctan\left(\frac{l_g^3}{l_g^2}\right) \quad \text{Expression 6}$$

$$\theta_2 = \arctan\left(\frac{v_{g\_min}^2}{T_1 \cdot a_z}\right) \qquad \text{Expression 7}$$

$$\theta_3 = k\theta_1 + (1-k)\theta_2, \ 0 \leq k \leq 1 \qquad \text{Expression 8}$$

where arctan indicates arc tangent, $l_g^3$ indicates the distance of the sensor on the third coordinate axis of the ground coordinate system in the time period from the $j^{th}$ correction moment to the $(j-1)^{th}$ correction moment, $l_g^2$ indicates the distance of the sensor on the second coordinate axis of the ground coordinate system in the time period from the $j^{th}$ correction moment to the $(j-1)^{th}$ correction moment, $v_{g\_min}^2$ indicates the velocity that is corresponding to the $j^{th}$ correction moment and that is of the sensor on the second coordinate axis of the ground coordinate system, $a_z$ indicates the gravity acceleration, and $T_1$ indicates the time period from the $j^{th}$ correction moment to the $(j-1)^{th}$ correction moment.

$l_g^3$ and $l_g^2$ may be calculated based on the corrected velocity of the sensor on the third coordinate axis of the ground coordinate system and the corrected velocity of the sensor on the second coordinate axis of the ground coordinate system in step 107 respectively.

When the rotation angle θ in the rotation matrix C is the first rotation angle $\theta_1$ in the expression 6, after the wearable device corrects the attitude matrix based on the rotation matrix C, a distance of the sensor on the third coordinate axis (that is, the coordinate axis parallel to the gravity direction) of the ground coordinate system in a time period from the $j^{th}$ correction moment to the $(j+1)^{th}$ correction moment can be reduced, so that the distance of the sensor on the third coordinate axis (that is, the coordinate axis parallel to the gravity direction) of the ground coordinate system approaches 0 as much as possible.

When the rotation angle θ in the rotation matrix C is the second rotation angle $\theta_2$ in the expression 7, after the wearable device corrects the attitude matrix based on the rotation matrix C, a velocity of the sensor on the second coordinate axis (that is, the coordinate axis parallel to the heading direction of the user) of the ground coordinate system at the $(j+1)^{th}$ correction moment can be reduced, so that the velocity that is corresponding to the $(j+1)^{th}$ correction moment and that is of the sensor on the second coordinate axis (that is, the coordinate axis parallel to the heading direction of the user) of the ground coordinate system approaches 0 as much as possible.

When the rotation angle θ in the rotation matrix C is the third rotation angle $\theta_3$ in the expression 8, after the wearable device corrects the attitude matrix based on the rotation matrix C, a distance of the sensor on the third coordinate axis (that is, the coordinate axis parallel to the gravity direction) of the ground coordinate system in a time period from the $j^{th}$ correction moment to the $(j+1)^{th}$ correction moment, and a velocity of the sensor on the second coordinate axis (that is, the coordinate axis parallel to the heading direction of the user) of the ground coordinate system at the $(j+1)^{th}$ correction moment can be reduced.

Figure 24:
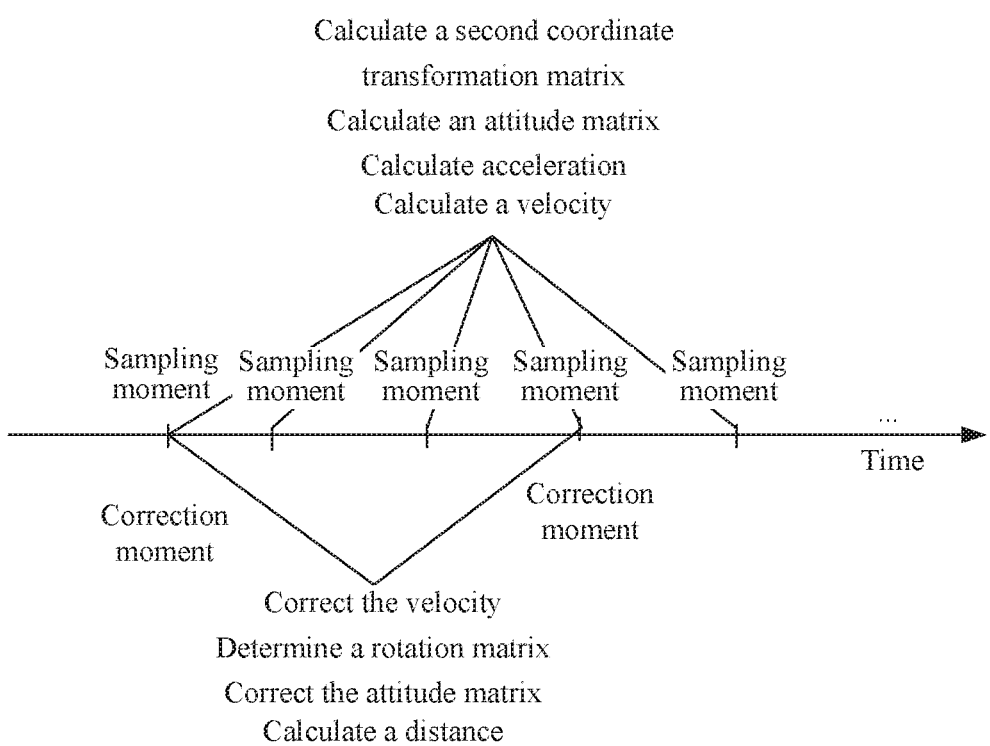
FIG. 24 is a time sequence diagram of a distance calculation method according to an embodiment of this application.
Figure 25:
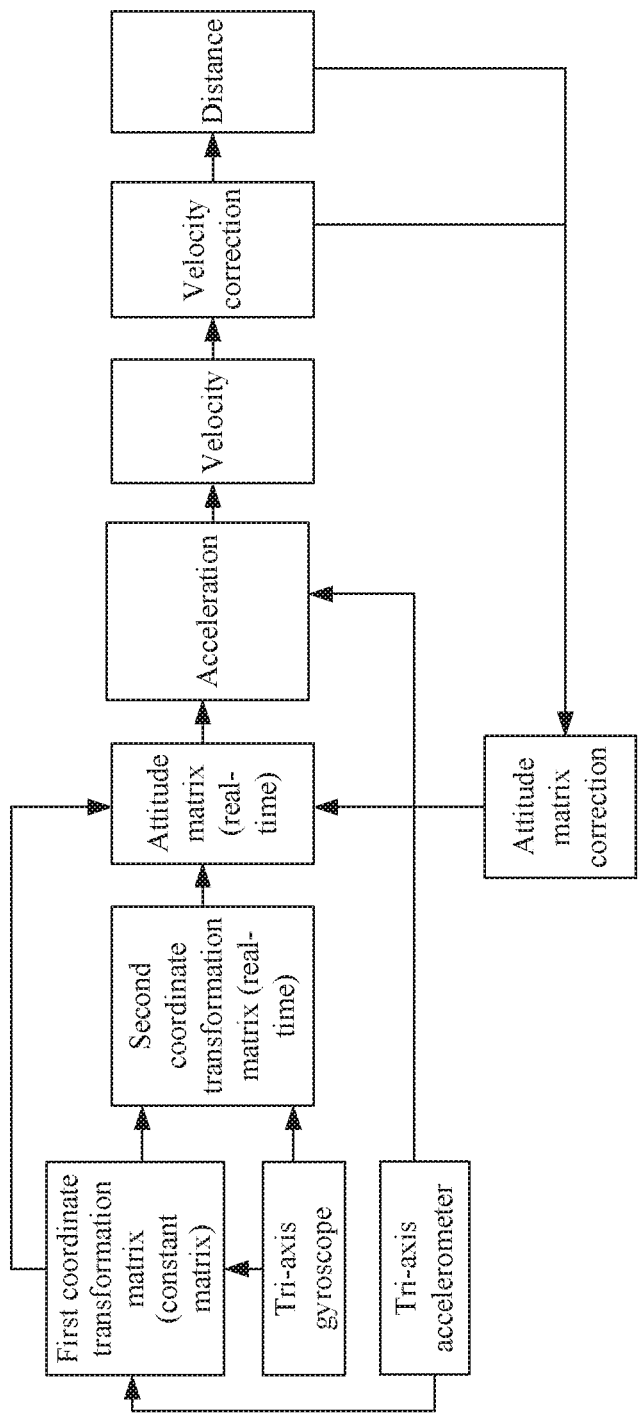
FIG. 25 is a flowchart of another distance calculation method according to an embodiment of this application.

It can be learned that in the embodiments of this application, referring to FIG. 24 and FIG. 25, at each sampling moment, the wearable device may calculate a second coordinate transformation matrix, an attitude matrix, acceleration, and a velocity once; and after each correction moment, the wearable device may further perform velocity correction and attitude matrix correction once, and calculate a distance once.

In addition, an embodiment of this application further provides a method. The method may include: when a wearable device detects that the wearable device is put on an arm, a hand, or a wrist, calculating, by the wearable device, a walking or running distance by using a first algorithm, and when the wearable device detects viewing of a user, displaying, by the wearable device, a step counting result, and identifying that the step counting result is obtained when the wearable device is put on the arm, the hand, or the wrist; or when the wearable device detects that the wearable device is put on an ankle, a shank, or a foot, calculating, by the wearable device, a walking or running distance by using a second algorithm, and when the wearable device detects viewing of a user, displaying, by the wearable device, a step counting result, and identifying that the step counting result is obtained when the wearable device is put on the ankle, the shank, or the foot. The second algorithm is the method provided in the foregoing method embodiment of this application. The first algorithm may be a general algorithm, or a step counting algorithm applicable when the wearable device is put on the arm, the hand, or the wrist. In a possible implementation, the first algorithm may be the same as the second algorithm.

When the wearable device detects that the wearable device is put on the arm, the hand, or the wrist, while displaying the step counting result, the wearable device may display a same identifier to identify that the wearable device is put on the arm, the hand, or the wrist, or may display an identifier corresponding to each of the arm, the hand, or the wrist to identify that the wearable device is specifically put on the arm, the hand, or the wrist.

Figure 26:
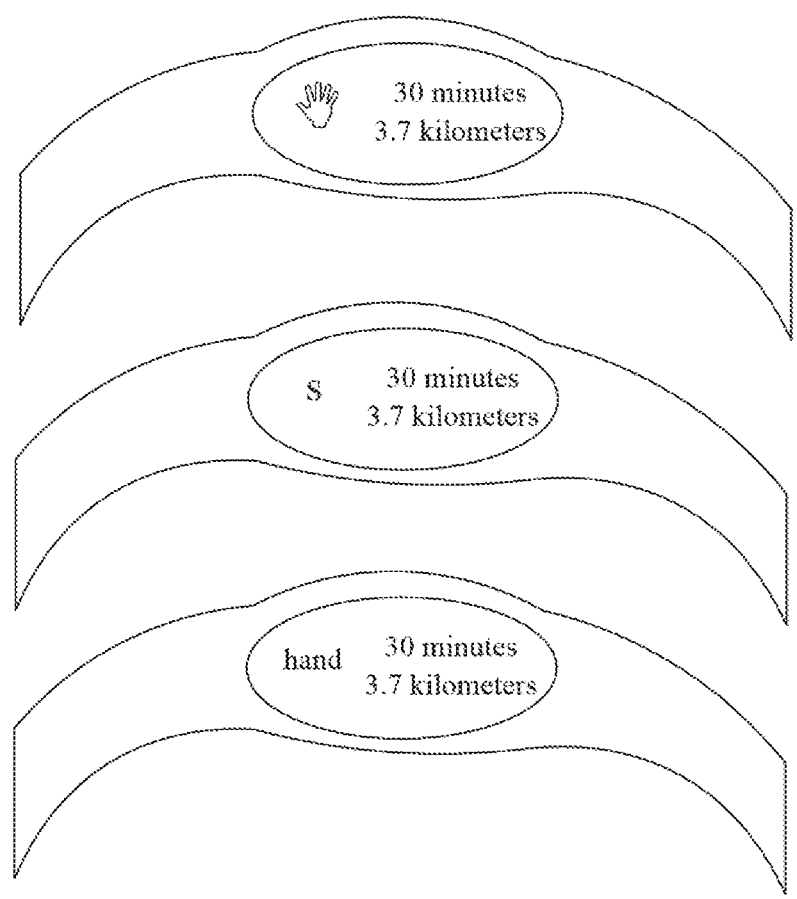
FIG. 26 is a schematic diagram of displaying a step counting result of a wearable device according to an embodiment of this application.

For example, referring to FIG. 26, when the wearable device detects that the wearable device is put on the arm, the hand, or the wrist, while displaying the step counting result, the wearable device may display a graphical representation of a hand, a Pinyin acronym "S", or an English spelling "hand" to identify that a current wearing position is the arm, the hand, or the wrist. Alternatively, when the wearable device detects that the wearable device is put on the arm, while displaying the step counting result, the wearable device may display a graphical representation of an arm, a Pinyin acronym "SB", an English spelling "arm", or the like to identify that a current wearing position is the arm; or when the wearable device detects that the wearable device is put on the wrist, while displaying the step counting result, the wearable device may display a graphical representation of a wrist, a Pinyin acronym "SW", or an English spelling "wrist" to identify that a current wearing position is the wrist.

When the wearable device detects that the wearable device is put on the ankle, the shank, or the foot, while displaying the step counting result, the wearable device may display a same identifier to identify that the wearable device is put on the ankle, the shank, or the foot, or may display an identifier corresponding to each of the ankle, the shank, or the foot to identify that the wearable device is specifically put on the ankle, the shank, or the foot.

Figure 27:
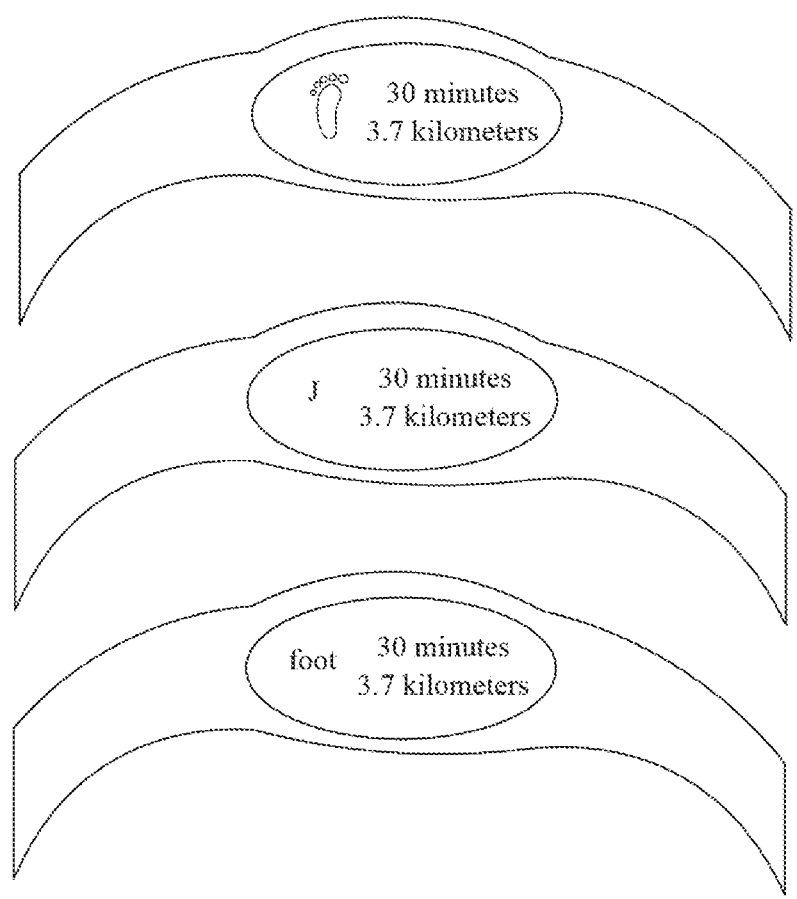
FIG. 27 is a schematic diagram of displaying a step counting result of another wearable device according to an embodiment of this application.

For example, referring to FIG. 27, when the wearable device detects that the wearable device is put on the ankle, the shank, or the foot, while displaying the step counting result, the wearable device may display a graphical representation of a foot, a Pinyin acronym "J", or an English spelling "foot" to identify that a current wearing position is the ankle, the shank, or the foot. Alternatively, when the wearable device detects that the wearable device is put on the ankle, while displaying the step counting result, the wearable device may display a graphical representation of an ankle, a Pinyin acronym "JH", an English spelling "ankle", or the like to identify that a current wearing position is the ankle; or when the wearable device detects that the wearable device is put on the shank, while displaying the step counting result, the wearable device may display a graphical representation of a leg, a Pinyin acronym "T", or an English spelling "leg" to identify that a current wearing position is the shank.

In another implementation, when the wearable device detects that the wearable device is put on a neck, the wearable device may calculate a walking or running distance by using a third algorithm. When detecting viewing of a user, the wearable device displays a step counting result and identifies that the step counting result is obtained when the wearable device is put on the neck (for example, displays a graphical representation of a neck, an English spelling "neck", or a Chinese Pinyin acronym "B"). The third algorithm may be a general algorithm, or a step counting algorithm applicable when the wearable device is put on the neck. In a possible implementation, the third algorithm may be alternatively the same as the first algorithm.

In another implementation, when the wearable device detects that the wearable device is put on the ankle (or the shank or the foot), the wearable device may automatically disable a module for detecting a physiological parameter such as blood pressure and/or a heartbeat.

In another implementation, when the wearable device detects that the wearable device is put on the neck, the wearable device may automatically disable a module for detecting a physiological parameter such as blood pressure and/or a heartbeat.

It should be understood that, that the wearable device detects viewing of a user includes: detecting, by the wearable device, that the user taps a power key of the wearable device; or detecting, by the wearable device, that the user taps a touchscreen of the wearable device; or detecting, by the wearable device, that the user operates the wearable device in a preset manner (for example, continuously shakes the wearable device twice); or detecting, by the wearable device, a voice instruction of the user; or detecting, by the wearable device, that the user stops for a time exceeding preset duration; or detecting, by the wearable device, that the user raises the hand to view the wearable device; or detecting, by the wearable device, that the user takes up the wearable device to view the wearable device; or detecting, by the wearable device, that the user removes the wearable device from the shank (or the ankle or a toe) and takes up the wearable device to view the wearable device.

The wearable device may detect a wearing position in a plurality of manners. For example, the wearable device may determine whether a data waveform detected by a sensor matches a preset condition, to determine the wearing position of the wearable device. There may be different preset conditions for different wearing positions. For another example, the wearable device may alternatively receive instruction information (for example, a voice instruction or a gesture instruction) of the user, to determine the wearing position of the wearable device.

It should be noted that the embodiments of this application may be used to calculate an attitude matrix, acceleration, a velocity, and a distance of a user in a moving process, especially a running or walking process, of the user. After a distance of a sensor in a ground coordinate system, that is, a motion distance of the user, is obtained through calculation, motion parameters such as calorie consumption, a step length, a pace, and a route of the user may be calculated based on the motion distance of the user. Motion guidance is provided for the user based on the motion parameters. For example, if the step length is too large, the step length is properly decreased. Motion ability of the user is evaluated based on the motion parameters, to create a personalized motion plan. For example, current motion ability of the user may be evaluated based on the motion pace and the distance of the user. The personalized motion plan is created based on the motion ability of the user, and a quantity of motion is gradually increased within a tolerance range of the user.

It can be understood that to implement the foregoing functions, the portable device includes corresponding hardware structures and/or software modules for performing the functions. A person of ordinary skill in the art should easily be aware that with reference to the algorithm steps in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments of this application, functional modules of the portable device may be divided according to the foregoing method examples. For example, the functional modules may be divided based on the functions, or at least two functions may be integrated into one processing module. The integrated module may be implemented in a form of hardware, or may be implemented in a form of a software functional module. It should be noted that in the embodiments of this application, module division is an example, and is merely logical function division. In actual implementation, another division manner may be used.

Figure 28:
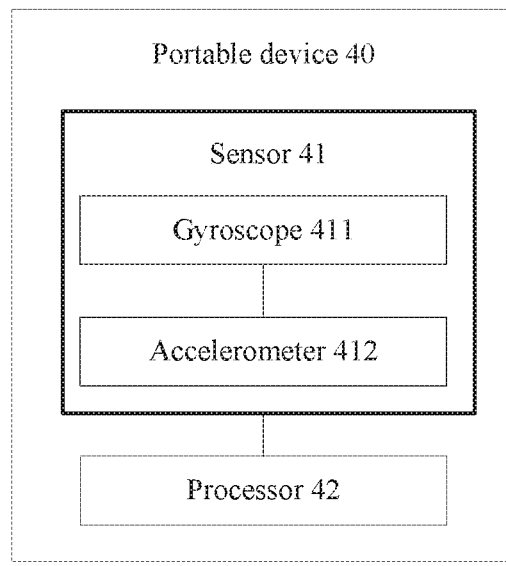
FIG. 28 is a schematic structural diagram of a portable device according to an embodiment of this application.

When the functional modules are divided based on the functions, FIG. 28 is a possible schematic composition diagram of a portable device 40 included in the foregoing embodiments. As shown in FIG. 28, the portable device 40 may include a sensor 41 and a processor 42. The sensor 41 may include a gyroscope 411. The processor 42 may be configured to support the portable device 40 in performing steps 101 and 102: calculating, based on a first coordinate transformation matrix and a measured value of the gyroscope that is corresponding to the $i^{th}$ sampling moment, a second coordinate transformation matrix corresponding to the $i^{th}$ sampling moment; and calculating, based on the first coordinate transformation matrix and the second coordinate transformation matrix corresponding to the $i^{th}$ sampling moment, an attitude matrix corresponding to the $i^{th}$ sampling moment, where i is an integer greater than 0.

The first coordinate transformation matrix is a constant matrix. The first coordinate transformation matrix is a coordinate transformation matrix between a sensor coordinate system and a foot coordinate system. The second coordinate transformation matrix is a coordinate transformation matrix between the foot coordinate system and a ground coordinate system. The attitude matrix is a coordinate transformation matrix between the sensor coordinate system and the ground coordinate system.

In addition, the sensor 41 may further include an accelerometer 412. The processor 42 may be further configured to support the portable device 40 in performing steps 101 to 109, steps 1021 and 1022, step 10220, step 1030, steps 1051 and 1052, steps 1061 to 1063, step 1070, and steps 1081 and 1082 in the foregoing method embodiments.

It should be noted that all related content of the steps included in the foregoing method embodiments may be cited in function descriptions of corresponding functional modules. Details are not described herein again.

The portable device 40 provided in this embodiment of this application is configured to perform the foregoing attitude matrix calculation method, and therefore can achieve a same effect as the foregoing attitude matrix calculation method.

Figure 29:
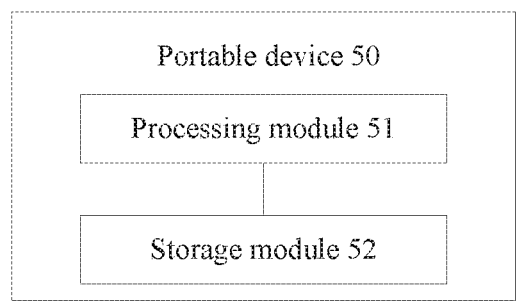
FIG. 29 is a schematic structural diagram of another portable device according to an embodiment of this application.

When the integrated unit is used, FIG. 29 is another possible schematic composition diagram of a portable device 50 included in the foregoing embodiments. As shown in FIG. 29, the portable device 50 may include a processing module 51 and a storage module 52.

The processing module 51 is configured to control and manage an action of the portable device. For example, the processing module 51 is configured to support the portable device in performing steps 101 to 109, steps 1021 and 1022, step 10220, step 1030, steps 1051 and 1052, steps 1061 to 1063, step 1070, and steps 1081 and 1082 in the foregoing method embodiments; and/or configured to perform other processes of the technologies described in this specification. The storage module 52 is configured to store program code and data of the portable device.

The processing module 51 may be a processor or a controller. The processing module may implement or execute various example logical blocks, modules, and circuits described with reference to content disclosed in this application. The processor may also be a combination that implements a computing function. For example, the processor includes a combination of one or more microprocessors, or a combination of a microprocessor (digital signal processor, DSP) and a microprocessor. In an implementation, the processing module 51 in FIG. 29 may be specifically the processor 42 in FIG. 28, and the storage module 52 may be a memory.

Based on the foregoing descriptions of the implementations, a person skilled in the art can clearly understand that for convenience and brevity of description, division of the foregoing functional modules is merely used as an example for illustration. In actual application, the foregoing functions may be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts shown as units may be one or more physical units, and may be located in one place, or may be distributed on different places. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

All or some of the foregoing embodiments may be implemented by software, hardware, firmware, or any combination thereof. When the integrated unit is implemented in a form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a computer program product. The computer program product is stored in a storage medium and includes several instructions for instructing a device (which may be a single-chip microcomputer, a chip, or the like) or a processor (processor) to perform all or some of the steps of the methods described in the embodiments of this application. The storage medium includes any medium that can store program code, for example, a USB flash drive, a removable hard disk, a ROM, a RAM, a magnetic disk, or a compact disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An attitude matrix calculation method, implemented by a portable device, wherein the portable device comprises a sensor, wherein the sensor comprises a gyroscope and an accelerometer, wherein the attitude matrix calculation method relates to a sensor coordinate system, a foot coordinate system, and a ground coordinate system, wherein the sensor coordinate system is preconfigured and is fixed on a body of the sensor, wherein the foot coordinate system is defined based on directions of a foot of a user carrying the portable device and a shank of the user carrying the portable device, wherein the ground coordinate system is fixed on an earth surface, and wherein the attitude matrix calculation method comprises:

calculating, based on a first coordinate transformation matrix and a measured value of the gyroscope in the sensor coordinate system that corresponds to an $i^{th}$ sampling moment, a second coordinate transformation matrix corresponding to the $i^{th}$ sampling moment, wherein the first coordinate transformation matrix is a constant matrix, wherein the first coordinate transformation matrix transforms first coordinates between the sensor coordinate system and the foot coordinate system, wherein the second coordinate transformation matrix transforms second coordinates between the foot coordinate system and the ground coordinate system, and wherein i is an integer greater than 0;

calculating, based on the first coordinate transformation matrix and the second coordinate transformation matrix, an attitude matrix corresponding to the $i^{th}$ sampling moment, wherein the attitude matrix transforms third coordinates between the sensor coordinate system and the ground coordinate system;

calculating, based on a measured value of the accelerometer in the sensor coordinate system that corresponds to the $i^{th}$ sampling moment and the attitude matrix, acceleration that corresponds to the $i^{th}$ sampling moment and that is of the sensor in the ground coordinate system;

calculating, based on the acceleration, a velocity that corresponds to the $i^{th}$ sampling moment and that is of the sensor in the ground coordinate system; and calculating a motion distance of the sensor in the ground coordinate system based on velocities that correspond to q sampling moments and that are of the sensor in the ground coordinate system, wherein q is an integer greater than or equal to 2, wherein the motion distance of the sensor represents a motion distance of the user in the ground coordinate system.

2. The attitude matrix calculation method of claim 1, wherein the attitude matrix comprises a third coordinate transformation matrix from the sensor coordinate system to the ground coordinate system.

3. The attitude matrix calculation method of claim 1, further comprising correcting a velocity that corresponds to each sampling moment in a time period from a $j^{th}$ correction moment to a $(j-1)^{th}$ correction moment and that is of the sensor on an $n^{th}$ coordinate axis of the ground coordinate system such that at the $j^{th}$ correction moment, a corrected velocity of the sensor on the $n^{th}$ coordinate axis of the ground coordinate system is 0, wherein j is an integer greater than 0, wherein a value of n is 1, 2, or 3, wherein a correction moment corresponds to a minimum value of a velocity of the sensor on a second coordinate axis of the ground coordinate system and that is in preset duration comprising a foot landing moment, and wherein the foot landing moment corresponds to a maximum value of magnitude of a vector represented by the measured value of the accelerometer.

4. The attitude matrix calculation method of claim 3, wherein after the $j^{th}$ correction moment, calculating the distance of the sensor in the ground coordinate system based on the velocities that correspond to the q sampling moments and that are of the sensor in the ground coordinate system comprises:

calculating, based on a corrected velocity that corresponds to each sampling moment in the time period from the $j^{th}$ correction moment to the $(j-1)^{th}$ correction moment and that is of the sensor on the $n^{th}$ coordinate axis of the ground coordinate system, a distance of the sensor on the $n^{th}$ coordinate axis of the ground coordinate system in the time period from the $j^{th}$ correction moment to the $(j-1)^{th}$ correction moment;

calculating a total distance that corresponds to the $j^{th}$ correction moment and that is of the sensor in the ground coordinate system based on the distance of the sensor on the $n^{th}$ coordinate axis of the ground coordinate system in the time period from the $j^{th}$ correction moment to the $(j-1)^{th}$ correction moment; and calculating a total distance that corresponds to the $(j-1)^{th}$ correction moment and that is of the sensor in the ground coordinate system.

5. The attitude matrix calculation method of claim 3, wherein after the $j^{th}$ correction moment, the attitude matrix calculation method further comprises:

constructing a rotation matrix; and multiplying the rotation matrix by an attitude matrix corresponding to an $m^{th}$ sampling moment after the $j^{th}$ correction moment to obtain a corrected attitude matrix corresponding to the $m^{th}$ sampling moment, wherein m is an integer greater than 0, wherein a correction moment corresponds to the minimum value of the velocity of the sensor on the second coordinate axis of the ground coordinate system and that is in a preset duration comprising a foot landing moment, wherein the foot landing moment corresponds to the maximum value of a magnitude of a vector represented by the measured value of the accelerometer, and wherein the rotation matrix is shown in the following expression:

$$C = \begin{bmatrix} 1 & 0 & 0 \\ 0 & \cos\theta & \sin\theta \\ 0 & -\sin\theta & \cos\theta \end{bmatrix},$$

wherein C indicates the rotation matrix and indicates a rotation angle.

6. The attitude matrix calculation method of claim 1, wherein a first coordinate axis of the foot coordinate system, a second coordinate axis of the foot coordinate system, and a third coordinate axis of the foot coordinate system are perpendicular to each other, wherein the second coordinate axis of the foot coordinate system is on a plane to which a direction of a heel-to-tiptoe connection line and an extension direction of the shank belong, and wherein the third coordinate axis of the foot coordinate system is parallel to the extension direction of the shank.

7. The attitude matrix calculation method of claim 1, wherein a first coordinate axis of the ground coordinate system, a second coordinate axis of the ground coordinate system, and a third coordinate axis of the ground coordinate system are perpendicular to each other, wherein the second coordinate axis of the ground coordinate system is parallel to a heading direction of the user carrying the portable device, and wherein the third coordinate axis of the ground coordinate system is parallel to a gravity direction.

8. The attitude matrix calculation method of claim 1, wherein before calculating the second coordinate transformation matrix, the attitude matrix calculation method further comprises calculating the first coordinate transformation matrix based on the measured value of the accelerometer and the measured value of the gyroscope.

9. The attitude matrix calculation method of claim 1, wherein calculating the second coordinate transformation matrix comprises:

multiplying the first coordinate transformation matrix by the measured value of the gyroscope to obtain an angular velocity that corresponds to the $i^{th}$ sampling moment and that is of the sensor in the foot coordinate system; and calculating, based on the angular velocity that corresponds to the $i^{th}$ sampling moment and that is of the sensor in the foot coordinate system, the second coordinate transformation matrix corresponding to the $i^{th}$ sampling moment.

10. A portable device, comprising:

a sensor comprising a gyroscope and an accelerometer;

a processor coupled to the sensor; and a memory coupled to the processor and storing instructions that, when executed by the processor, cause the portable device to be configured to:

calculate, based on a first coordinate transformation matrix and a measured value of the gyroscope in a sensor coordinate system that corresponds to an $i^{th}$ sampling moment, a second coordinate transformation matrix corresponding to the $i^{th}$ sampling moment, wherein the first coordinate transformation matrix is a constant matrix, wherein the first coordinate transformation matrix transforms first coordinates between the sensor coordinate system and a foot coordinate system, wherein the second coordinate transformation matrix transforms second coordinates between the foot coordinate system and a ground coordinate system, wherein i is an integer greater than 0, wherein the sensor coordinate system is preconfigured and is fixed on a body of the sensor, wherein the foot coordinate system is defined based on directions of a foot of a user carrying the portable device and a shank of the user carrying the portable device, and wherein the ground coordinate system is fixed on an earth surface;

calculate, based on the first coordinate transformation matrix and the second coordinate transformation matrix, an attitude matrix corresponding to the $i^{th}$ sampling moment, wherein the attitude matrix transforms third coordinates between the sensor coordinate system and the ground coordinate system;

calculate, based on a measured value of the accelerometer in the sensor coordinate system that corresponds to the $i^{th}$ sampling moment and the attitude matrix corresponding to the $i^{th}$ sampling moment, acceleration that corresponds to the $i^{th}$ sampling moment and that is of the sensor in the ground coordinate system;

calculate, based on the acceleration that corresponds to the $i^{th}$ sampling moment and that is of the sensor in the ground coordinate system, a velocity that corresponds to the $i^{th}$ sampling moment and that is of the sensor in the ground coordinate system; and calculate a motion distance of the sensor in the ground coordinate system based on velocities that correspond to q sampling moments and that are of the sensor in the ground coordinate system, wherein q is an integer greater than or equal to 2, wherein the motion distance of the sensor represents a motion distance of the user in the ground coordinate system.

11. The portable device of claim 10, wherein the attitude matrix comprises a third coordinate transformation matrix from the sensor coordinate system to the ground coordinate system.

12. The portable device of claim 10, wherein the instructions further cause the portable device to be configured to correct a velocity that corresponds to each sampling moment in a time period from a $j^{th}$ correction moment to a $(j-1)^{th}$ correction moment and that is of the sensor on an $n^{th}$ coordinate axis of the ground coordinate system such that at the $j^{th}$ correction moment, a corrected velocity of the sensor on the $n^{th}$ coordinate axis of the ground coordinate system is 0, wherein j is an integer greater than 0, wherein a value of n is 1, 2, or 3, wherein a correction moment corresponds to a minimum value of a velocity of the sensor on a second coordinate axis of the ground coordinate system and that is in preset duration comprising a foot landing moment, and wherein the foot landing moment corresponds to a maximum value of magnitude of a vector represented by the measured value of the accelerometer.

13. The portable device of claim 12, wherein the instructions further cause the portable device to be configured to:
calculate, after the $j^{th}$ correction moment, a distance of the sensor on the $n^{th}$ coordinate axis of the ground coordinate system in the time period from the $j^{th}$ correction moment to the $(j-1)^{th}$ correction moment based on a corrected velocity that corresponds to each sampling moment in the time period from the $j^{th}$ correction moment to the $(j-1)^{th}$ correction moment and that is of the sensor on the $n^{th}$ coordinate axis of the ground coordinate system;

calculate a total distance that corresponds to the $j^{th}$ correction moment and that is of the sensor in the ground coordinate system based on the distance of the sensor on the $n^{th}$ coordinate axis of the ground coordinate system in the time period from the $j^{th}$ correction moment to the $(j-1)^{th}$ correction moment; and calculate a total distance that corresponds to the $(j-1)^{th}$ correction moment and that is of the sensor in the ground coordinate system.

14. The portable device of claim 10, wherein the instructions further cause the portable device to be configured to:
construct a rotation matrix after a $j^{th}$ correction moment; and
multiply the rotation matrix by an attitude matrix corresponding to an $m^{th}$ sampling moment after the $j^{th}$ correction moment to obtain a corrected attitude matrix corresponding to the $m^{th}$ sampling moment, wherein m is an integer greater than 0, wherein a correction moment corresponds to the minimum value of a velocity of the sensor on a second coordinate axis of the ground coordinate system and that is in a preset duration comprising a foot landing moment, wherein the foot landing moment corresponds to the maximum value of a magnitude of a vector represented by a measured value of the accelerometer, and wherein the rotation matrix is shown in the following expression:

$$C = \begin{bmatrix} 1 & 0 & 0 \\ 0 & \cos\theta & \sin\theta \\ 0 & -\sin\theta & \cos\theta \end{bmatrix},$$

wherein C indicates the rotation matrix and $\theta$ indicates a rotation angle.

15. The portable device of claim 10, wherein the instructions further cause the portable device to be configured to calculate the first coordinate transformation matrix based on a measured value of the accelerometer and the measured value of the gyroscope.

16. The portable device of claim 10, wherein a first coordinate axis of the foot coordinate system, a second coordinate axis of the foot coordinate system, and a third coordinate axis of the foot coordinate system are perpendicular to each other, wherein the second coordinate axis of the foot coordinate system is on a plane to which a direction of a heel-to-tiptoe connection line and an extension direction of a shank belong, and wherein the third coordinate axis of the foot coordinate system is parallel to the extension direction of the shank.

17. The portable device of claim 10, wherein a first coordinate axis of the ground coordinate system, a second coordinate axis of the ground coordinate system, and a third coordinate axis of the ground coordinate system are perpendicular to each other, wherein the second coordinate axis of the ground coordinate system is parallel to a heading direction of the user carrying the portable device, and wherein the third coordinate axis of the ground coordinate system is parallel to a gravity direction.

18. The portable device of claim 10, wherein the instructions further cause the portable device to be configured to:
multiply the first coordinate transformation matrix by the measured value of the gyroscope that corresponds to the $i^{th}$ sampling moment to obtain an angular velocity that corresponds to the $i^{th}$ sampling moment and that is of the sensor in the foot coordinate system; and calculate, based on the angular velocity that corresponds to the $i^{th}$ sampling moment and that is of the sensor in the foot coordinate system, the second coordinate transformation matrix corresponding to the $i^{th}$ sampling moment.

19. A computer program product comprising computer-executable instructions stored on a non-transitory computer-readable medium that, when executed by a processor, cause a portable device to:

calculate, based on a first coordinate transformation matrix and a measured value of a gyroscope in a sensor coordinate system that corresponds to an $i^{th}$ sampling moment, a second coordinate transformation matrix corresponding to the $i^{th}$ sampling moment, wherein the portable device comprises a sensor, wherein the sensor comprises the gyroscope and an accelerometer, wherein the first coordinate transformation matrix is a constant matrix, wherein the first coordinate transformation matrix transforms first coordinates between the sensor coordinate system and a foot coordinate system, wherein the second coordinate transformation matrix transforms second coordinates between the foot coordinate system and a ground coordinate system, wherein i is an integer greater than 0, wherein the sensor coordinate system is preconfigured and is fixed on a body of the sensor, wherein the foot coordinate system is defined based on directions of a foot of a user carrying the portable device and a shank of the user carrying the portable device, and wherein the ground coordinate system is fixed on an earth surface;

calculate, based on the first coordinate transformation matrix and the second coordinate transformation matrix, an attitude matrix corresponding to the $i^{th}$ sampling moment, wherein the attitude matrix transforms third coordinates between the sensor coordinate system and the ground coordinate system;

calculate, based on a measured value of the accelerometer in the sensor coordinate system that corresponds to the $i^{th}$ sampling moment and the attitude matrix corresponding to the $i^{th}$ sampling moment, acceleration that corresponds to the $i^{th}$ sampling moment and that is of the sensor in the ground coordinate system;

calculate, based on the acceleration that corresponds to the $i^{th}$ sampling moment and that is of the sensor in the ground coordinate system, a velocity that corresponds to the $i^{th}$ sampling moment and that is of the sensor in the ground coordinate system; and calculate a motion distance of the sensor in the ground coordinate system based on velocities that correspond to q sampling moments and that are of the sensor in the ground coordinate system, wherein q is an integer greater than or equal to 2, wherein the motion distance of the sensor represents a motion distance of the user in the ground coordinate system.

20. The computer program product of claim 19, wherein the attitude matrix comprises a third coordinate transformation matrix from the sensor coordinate system to the ground coordinate system.

* * * * *

UNITED STATES PATENT AND TRADEMARK OFFICE
CERTIFICATE OF CORRECTION

PATENT NO. : 11,392,668 B2
APPLICATION NO. : 16/649004
DATED : July 19, 2022
INVENTOR(S) : Xiaohan Chen, Yu Wang and Chen Dong It is certified that error appears in the above-identified patent and that said Letters Patent is hereby corrected as shown below:

On the Title Page

Page 2, (56) References Cited, Foreign Patent Documents: "JP 1968604 B2 7/2012" should read "JP 4968604 B2 7/2012"

Signed and Sealed this
Eleventh Day of October, 2022

Katherine Kelly Vidal
*Director of the United States Patent and Trademark Office*